(12) United States Patent
Kato et al.

(10) Patent No.: US 9,020,339 B2
(45) Date of Patent: Apr. 28, 2015

(54) OPTICAL TRANSMISSION SYSTEM AND CONTROL METHOD

(71) Applicant: Fujitsu Limited, Kawasaki-shi, Kanagawa (JP)

(72) Inventors: Tomoyuki Kato, Yokohama (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/017,549

(22) Filed: Sep. 4, 2013

(65) Prior Publication Data

US 2014/0119725 A1    May 1, 2014

(30) Foreign Application Priority Data

Oct. 26, 2012 (JP) .................................. 2012-237310

(51) Int. Cl.
| | |
|---|---|
| *H04J 14/02* | (2006.01) |
| *H04B 10/077* | (2013.01) |
| *G06F 13/16* | (2006.01) |
| *H04B 10/50* | (2013.01) |

(52) U.S. Cl.
CPC ........ *H04B 10/0775* (2013.01); *G06F 13/1689* (2013.01); *H04B 10/5057* (2013.01); *H04J 14/02* (2013.01)

(58) Field of Classification Search
CPC .............................. H04J 14/204; H04J 14/205
USPC ......................................... 398/25, 30–34, 83
See application file for complete search history.

(56) References Cited

U.S. PATENT DOCUMENTS

| | | | |
|---|---|---|---|
| 5,541,931 A | 7/1996 | Lee | |
| 7,068,938 B1 | 6/2006 | Islam et al. | |
| 2003/0174311 A1 | 9/2003 | Wilson et al. | |
| 2003/0185567 A1* | 10/2003 | Kurumida et al. | 398/79 |
| 2009/0257755 A1* | 10/2009 | Buelow | 398/184 |
| 2013/0070254 A1* | 3/2013 | Winzer | 356/478 |

FOREIGN PATENT DOCUMENTS

EP    1137213 A2    9/2001

OTHER PUBLICATIONS

Xingwen Yi, et al., "Tb/s Coherent Optical OFDM Systems Enabled by Optical Frequency Combs", Journal of Lightwave Technology, vol. 28, No. 14, Jul. 15, 2010, pp. 2054-2061.

(Continued)

*Primary Examiner* — David Payne
*Assistant Examiner* — Casey Kretzer
(74) *Attorney, Agent, or Firm* — Fujitsu Patent Center

(57) ABSTRACT

An optical transmission system includes multiple multiplexers connected in series and each multiplexing an optical signal and given signal light. Each of the multiplexers includes a multiplexing unit that multiplexes the given signal light that is subject to multiplexing and a second optical signal of a frequency that is adjacent to the frequency of a first optical signal that is included in the given signal light; a monitoring unit that monitors deviation between timings of the first optical signal that is included in the signal light multiplexed with the second optical signal by the multiplexing unit, and the second optical signal; and an adjusting unit that based on a result of monitoring by the monitoring unit, adjusts the timing of the second optical signal that is to be multiplexed with the given signal light, by the multiplexing unit.

7 Claims, 22 Drawing Sheets

(56) References Cited

OTHER PUBLICATIONS

Extended European Search Report dated Mar. 6, 2014 for corresponding European Application No. 13181675.3, 6 pages. **Please note NPL Document "Xingwen Yi, et al., "Tb/s Coherent Optical OFDM Systems Enabled by Optical Frequency Combs", Journal of Lightwave Technology, vol. 28, No. 14, Jul. 15, 2010, pp. 2054-2061."

Shen, Yunfeng et al., "Effect of Bit Pattern Misalignment on Coherent Crosstalk in Optical Add/Drop Multiplexers," IEEE Photonics Technology Letters, vol. 12, No. 7, Jul. 1, 2000, pp. 891-893, XP011290721.
EPOA—European Office Action of European Patent Application No. 13181675.3, dated Sep. 4, 2014.

* cited by examiner

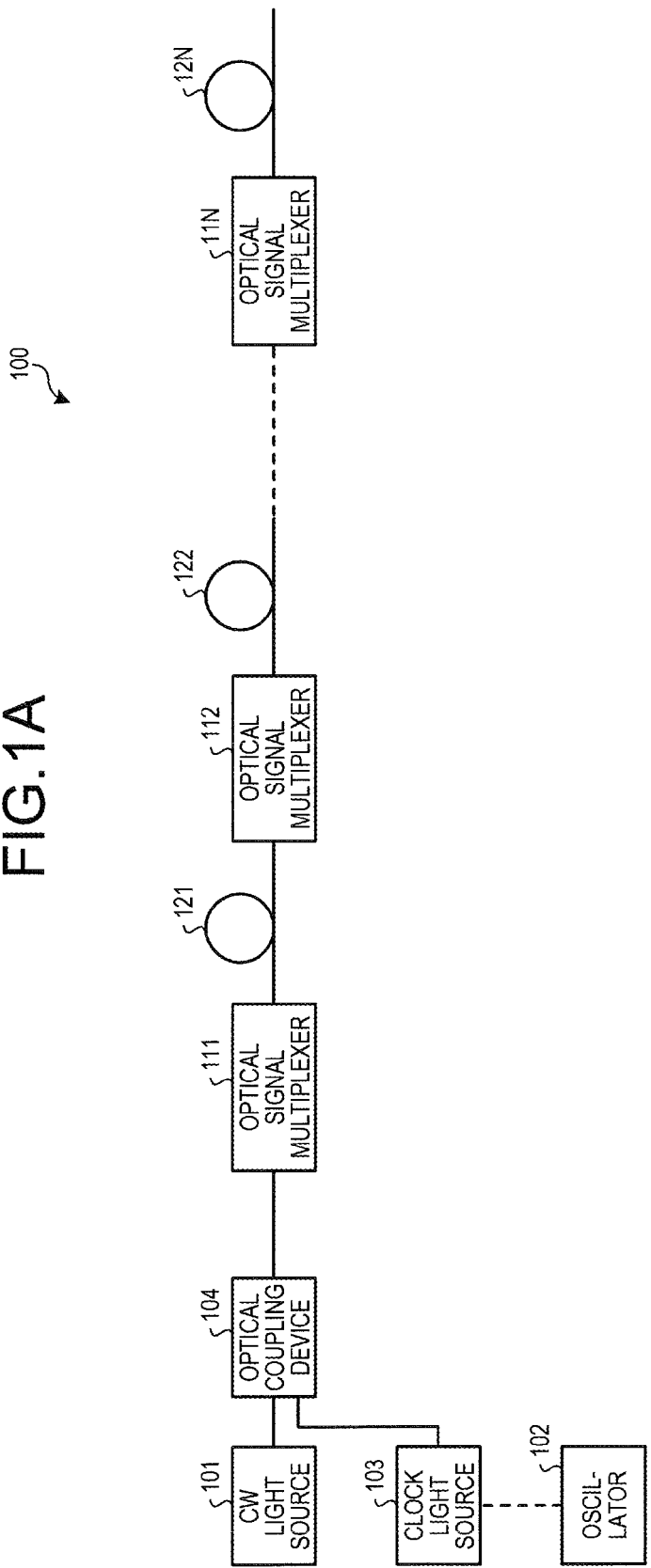

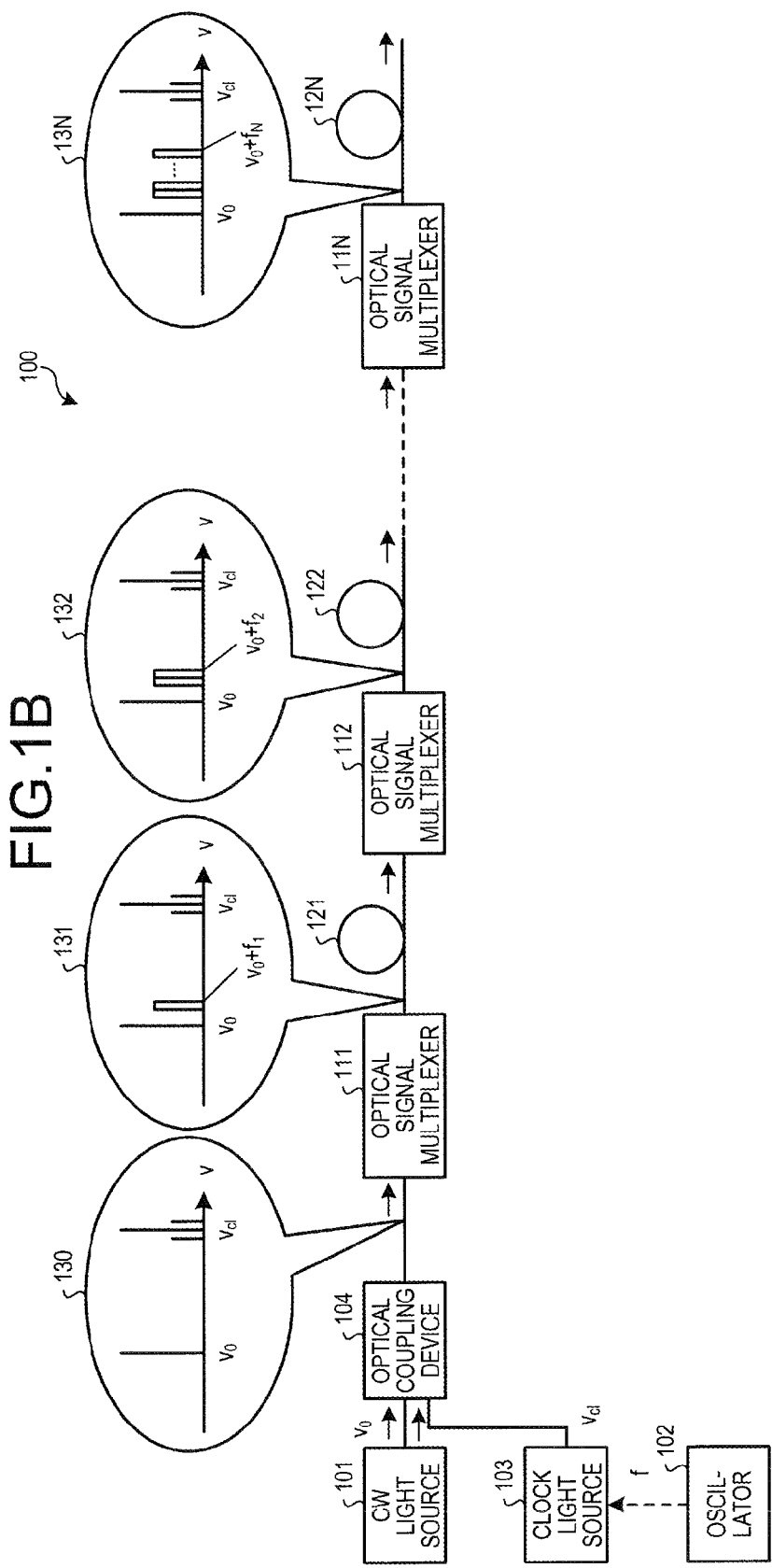

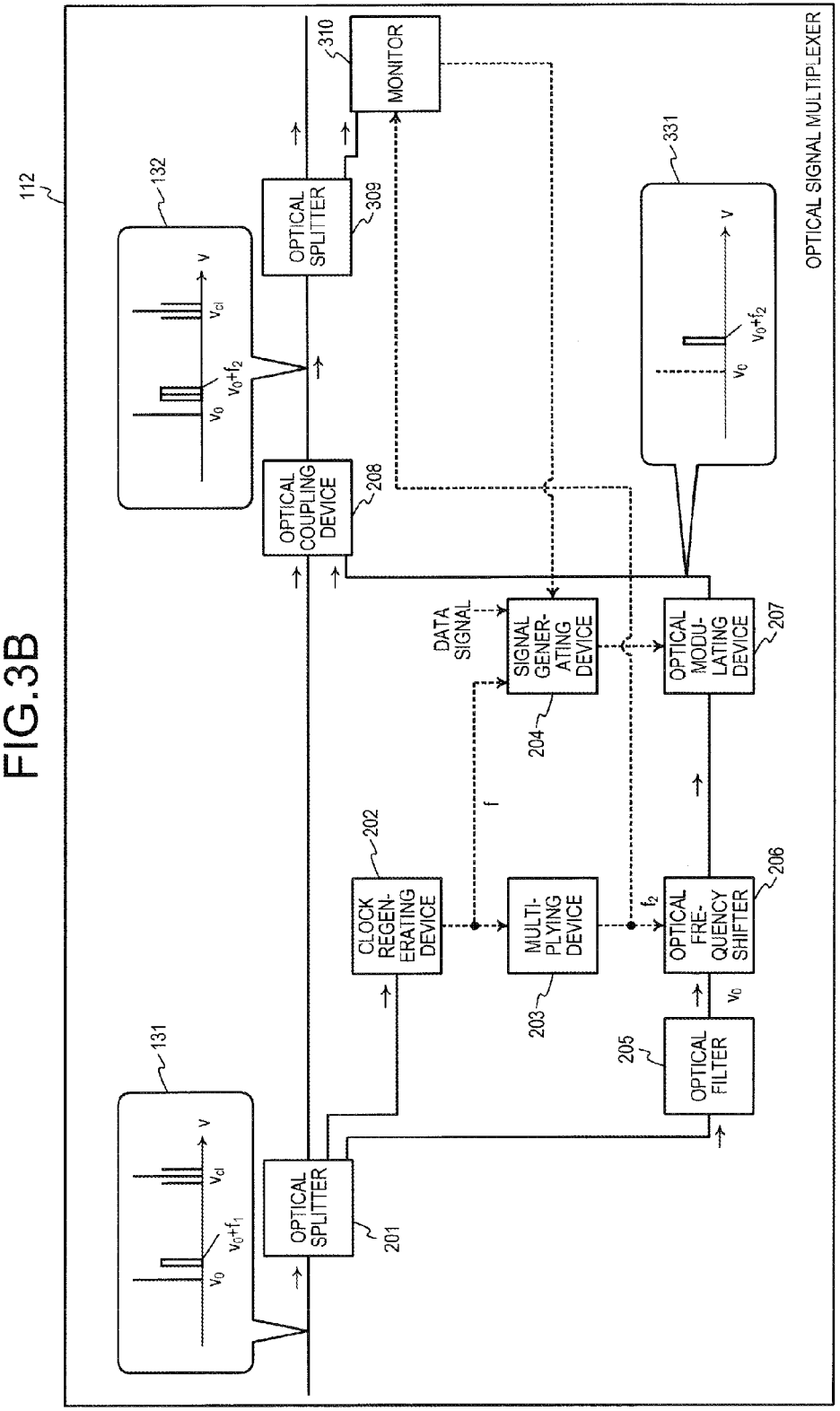

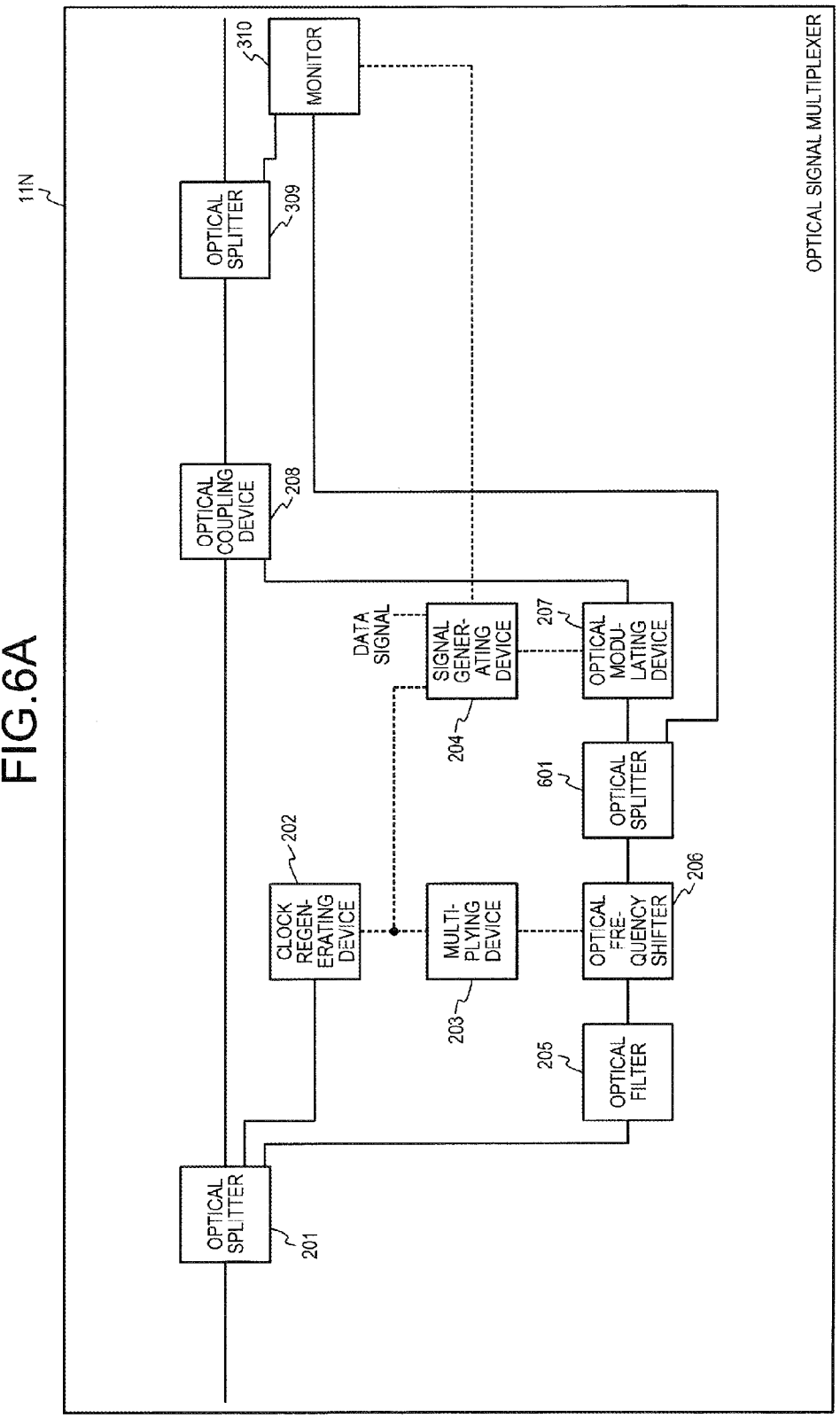

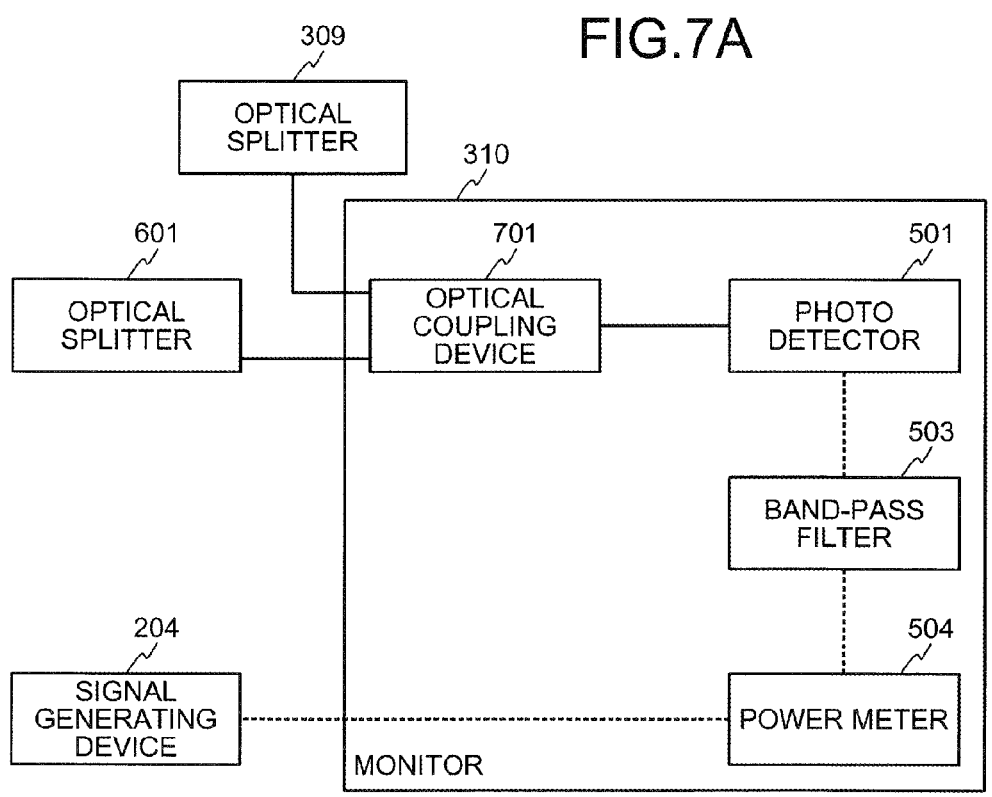

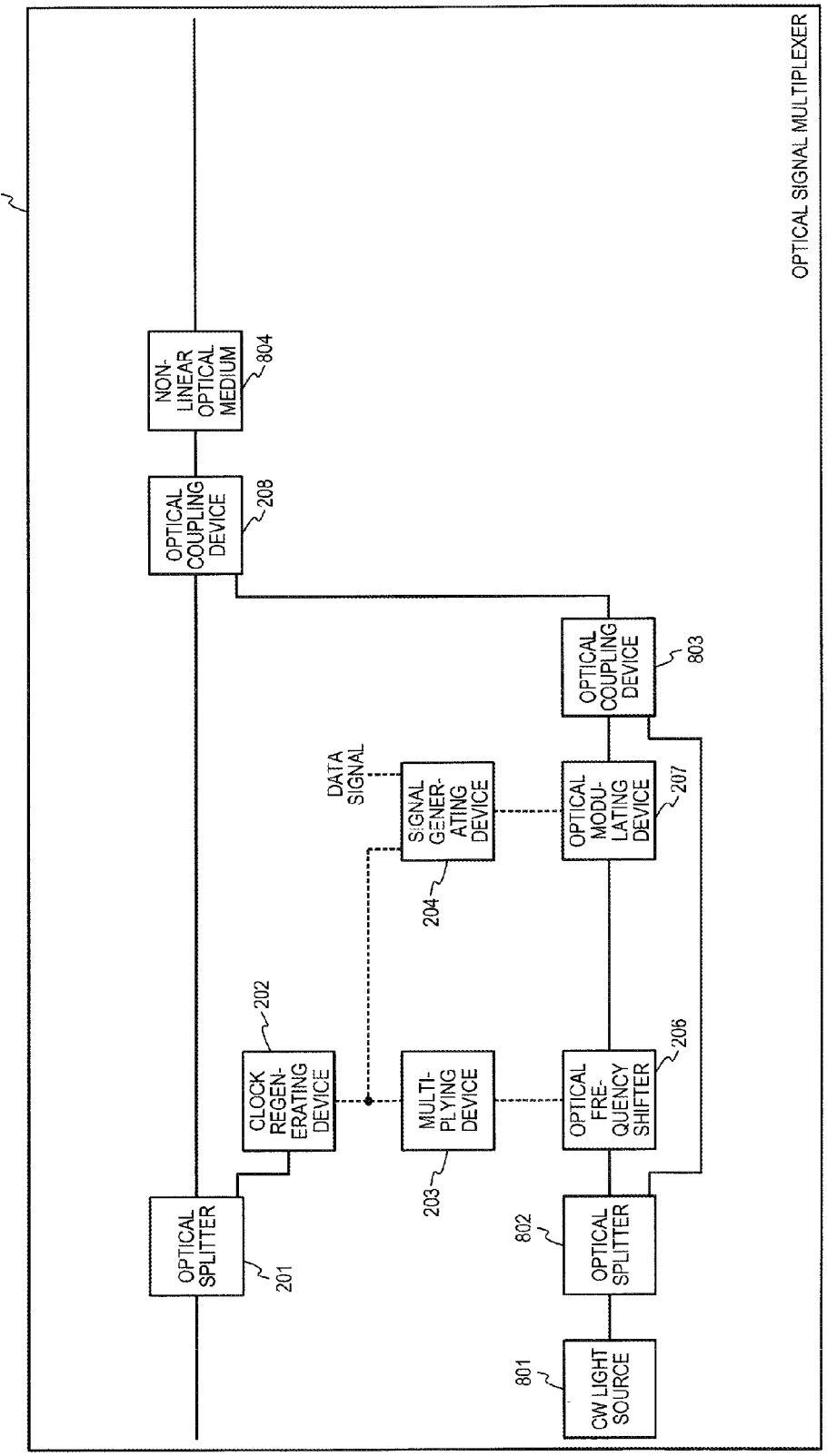

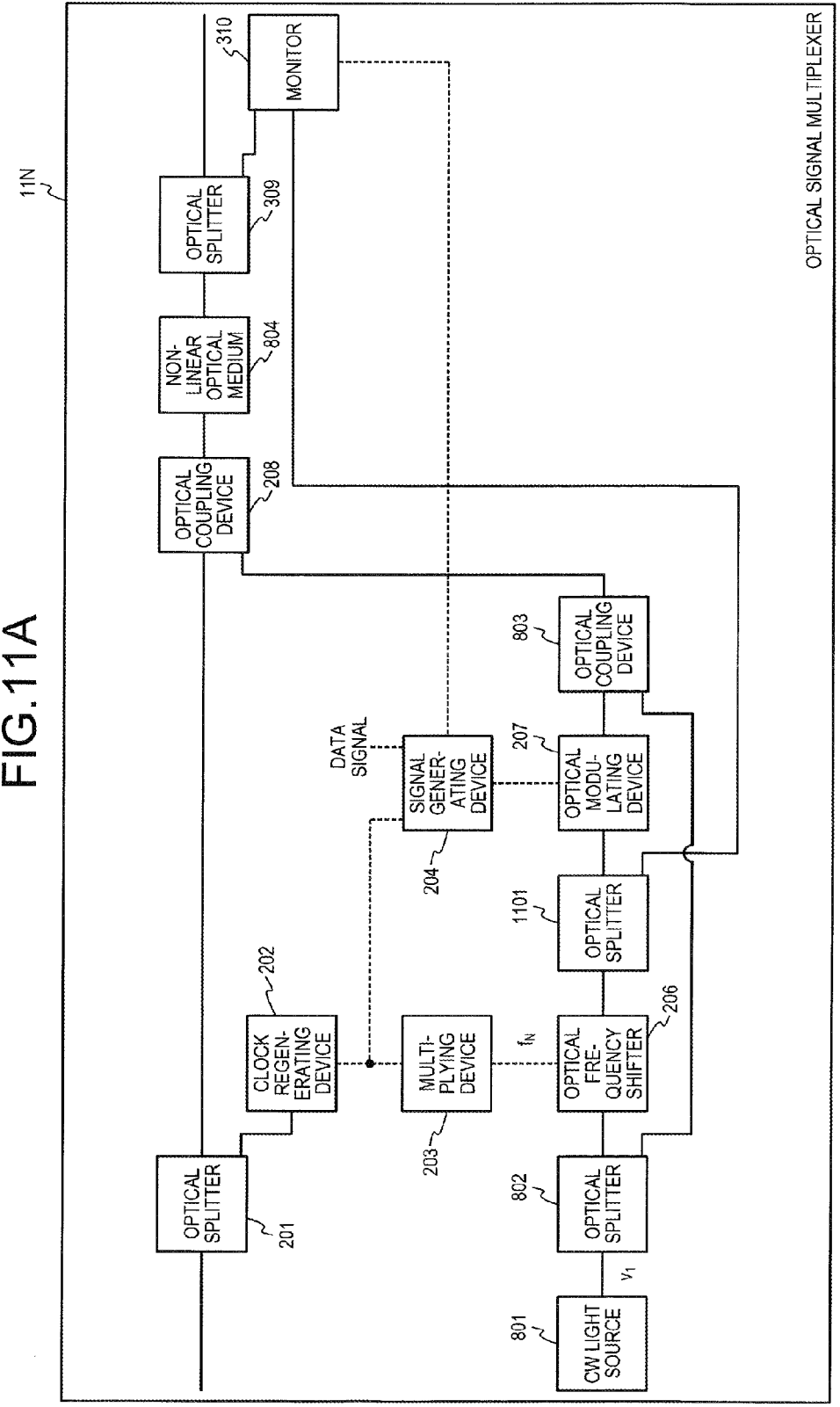

OPTICAL TRANSMISSION SYSTEM AND CONTROL METHOD

CROSS REFERENCE TO RELATED APPLICATIONS

This application is based upon and claims the benefit of priority of the prior Japanese Patent Application No. 2012-237310, filed on Oct. 26, 2012, the entire contents of which are incorporated herein by reference.

FIELD

The embodiments discussed herein are related to an optical transmission system and a control method.

BACKGROUND

Coherent optical orthogonal frequency division multiplexing (OFDM) and Nyquist wavelength division multiplexing (WDM) are conventionally known by which optical signals are densely arranged in intervals of frequency (wavelength) (see, e.g., Xingwen Yi, "Tb/s Coherent Optical OFDM Systems Enabled by Optical Frequency Combs", Journal of Lightwave Technology, Vol. 28, No. 14, Jul. 15, 2010, pp. 2054-2061).

However, according to the conventional techniques, the timings of the optical signals to be multiplexed may deviate from one another due to differences in the length of the optical paths caused by wavelength dispersion, etc. Therefore, when the optical signals are densely arranged in intervals of frequency, a problem arises in that suppression of a cross-talk between optical signals is difficult.

SUMMARY

According to an aspect of an embodiment, an optical transmission system includes multiple multiplexers connected in series and each multiplexing an optical signal and given signal light. Each of the multiplexers includes a multiplexing unit that multiplexes the given signal light that is subject to multiplexing and a second optical signal of a frequency that is adjacent to the frequency of a first optical signal that is included in the given signal light; a monitoring unit that monitors deviation between timings of the first optical signal that is included in the signal light multiplexed with the second optical signal by the multiplexing unit, and the second optical signal; and an adjusting unit that based on a result of monitoring by the monitoring unit, adjusts the timing of the second optical signal that is to be multiplexed with the given signal light, by the multiplexing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram of an example of an optical transmission system according to a first embodiment;
FIG. 1B is a diagram of an example of the flow of light beams and electrical signals in the optical transmission system depicted in FIG. 1A;
FIG. 3B is a diagram of an example of the flow of light beams and electrical signals in the optical signal multiplexer depicted in FIG. 3A;
FIG. 6A is a diagram of another example of a specific configuration of the optical signal multiplexer at the N-th stage;
FIG. 7A is a diagram of another example of a specific configuration of the optical monitor of the optical signal multiplexer at the k-th stage;
FIG. 8A is a diagram of a specific configuration of an optical transmitting apparatus according to a second embodiment;
FIG. 11A is a diagram of a specific configuration of the optical signal multiplexer at the N-th stage.

DESCRIPTION OF EMBODIMENTS

Figure 2A:
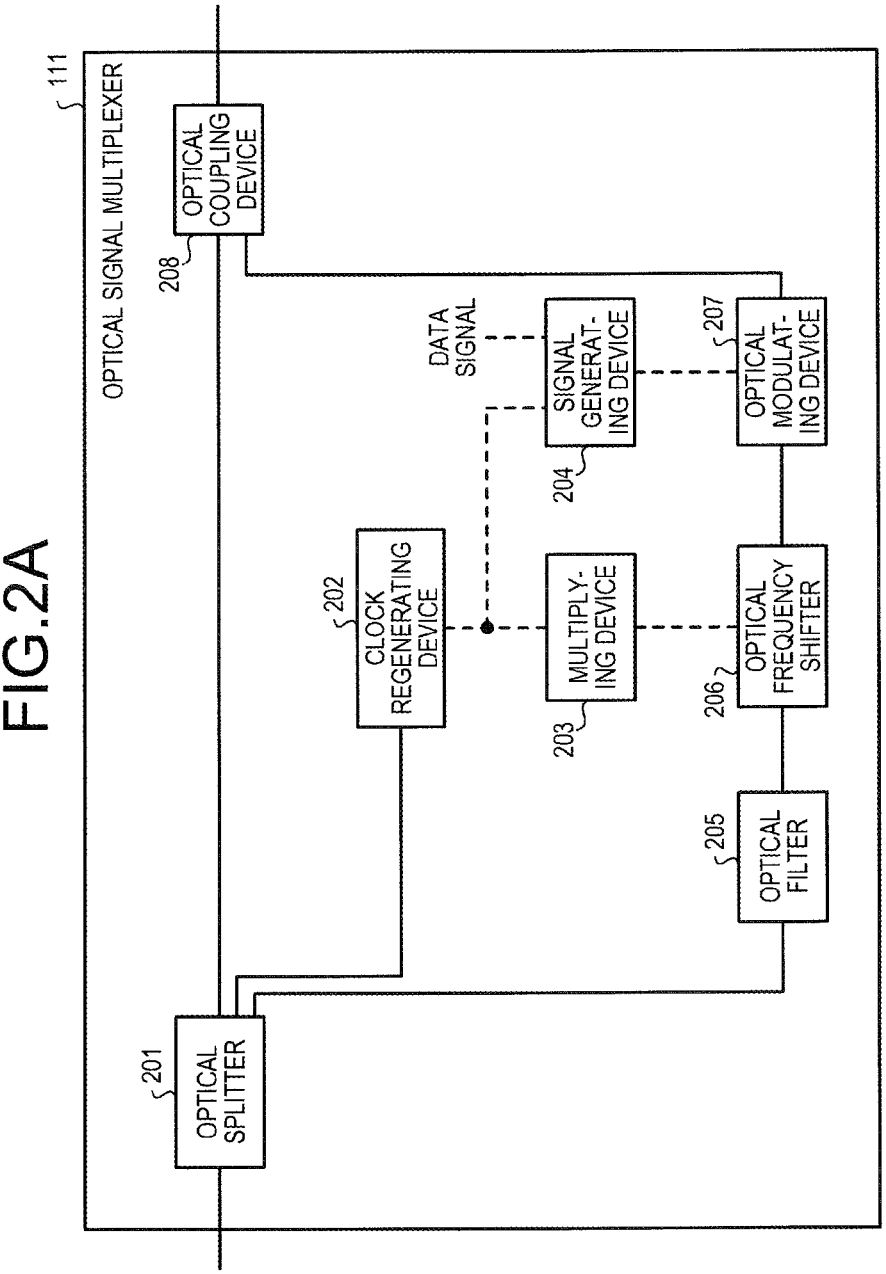
FIG. 2A is a diagram of a specific configuration of a optical signal multiplexer at a first stage.

Preferred embodiments of an optical transmission system and a control method will be described in detail with reference to the accompanying drawings.

FIG. 1A is a diagram of an example of an optical transmission system according to the first embodiment. FIG. 1B is a diagram of an example of the flow of light beams and electrical signals in the optical transmission system depicted in FIG. 1A. The optical transmission system 100 depicted in FIGS. 1A and 1B transmits an optical signal generated by orthogonal frequency division multiplexing (OFDM).

The optical transmission system 100 includes a continuous wave (CW) light source 101, an oscillator 102, a clock light source 103, an optical coupling device 104, N-stage (N≥3) optical signal multiplexers 111 to 11N, and optical fibers 121 to 12N.

The CW light source 101 generates a continuous wave light beam having, for example, a frequency v0 and outputs the generated continuous wave light beam to the optical coupling device 104. The oscillator 102 oscillates an electrical signal of a frequency f and outputs the oscillated electrical signal of the frequency f to the clock light source 103.

The clock light source 103, using the electrical signal of the frequency f output from the oscillator 102, generates a clock signal of a frequency vcl (≠v0) and an intensity that varies at the frequency f. The clock light source 103 outputs the generated clock signal of the frequency vcl to the optical coupling device 104.

The optical coupling device 104 couples the continuous wave light beam of the frequency v0 and output from the CW light source 101, and the clock signal of the frequency vcl and output from the clock light source 103, and outputs the coupled light beam to the optical signal multiplexer 111. The optical signal multiplexers 111 to 11N are connected in series to each other.

The optical signal multiplexer 111 disposed at a first stage, adds (multiplexes) the light beam output from the optical coupling device 104 and an optical signal of a wavelength that is different from that of the light beam from the optical coupling device 104; and via the optical fiber 121, outputs the resulting light beam to the optical signal multiplexer 112 disposed at a second stage.

Similarly, each of the optical signal multiplexers 112 to 11N adds the light beam input from the previous stage thereof and an optical signal whose wavelength is different from the frequencies of the light beam input thereinto; and outputs the resulting light beam downstream via the optical fibers 122 to 12N. The optical signal multiplexers 111, 112, . . . , and 11N can implement plural multiplexers that are connected in series and that multiplex optical signals with the signal light beam.

The components that are included in the signal light among the optical signal multiplexers 111 to 11N will be described. As represented by a spectrum 130, the light beam output from the optical coupling device 104 includes the continuous wave light beam of the frequency v0 and the clock signal if the frequency vcl. As represented by a spectrum 131, the light beam output from the optical signal multiplexer 111 is a light beam formed by adding an optical signal of the frequency v0+f1 to the components of the light beam output from the optical coupling device 104.

As represented by a spectrum 132, the light beam output from the optical signal multiplexer 112 at the second stage is a light beam formed by adding an optical signal of the frequency v0+f2 to the components of the light beam output from the optical signal multiplexer 111 at the first stage. As represented by a spectrum 13N, the light beam output from the optical signal multiplexer 11N in the N-th stage is a light beam formed by adding an optical signal of the frequency v0+fN to the components of the light beam output from the optical signal multiplexer 11(N−1) at the previous stage thereof.

Thus, the optical signal multiplexers 111, 112, . . . , and 11N can transmit the signal light beam formed by wavelength-multiplexing the signal light beams having frequencies v0+f1, v0+f2, . . . , v0+fN with each other.

Figure 2B:
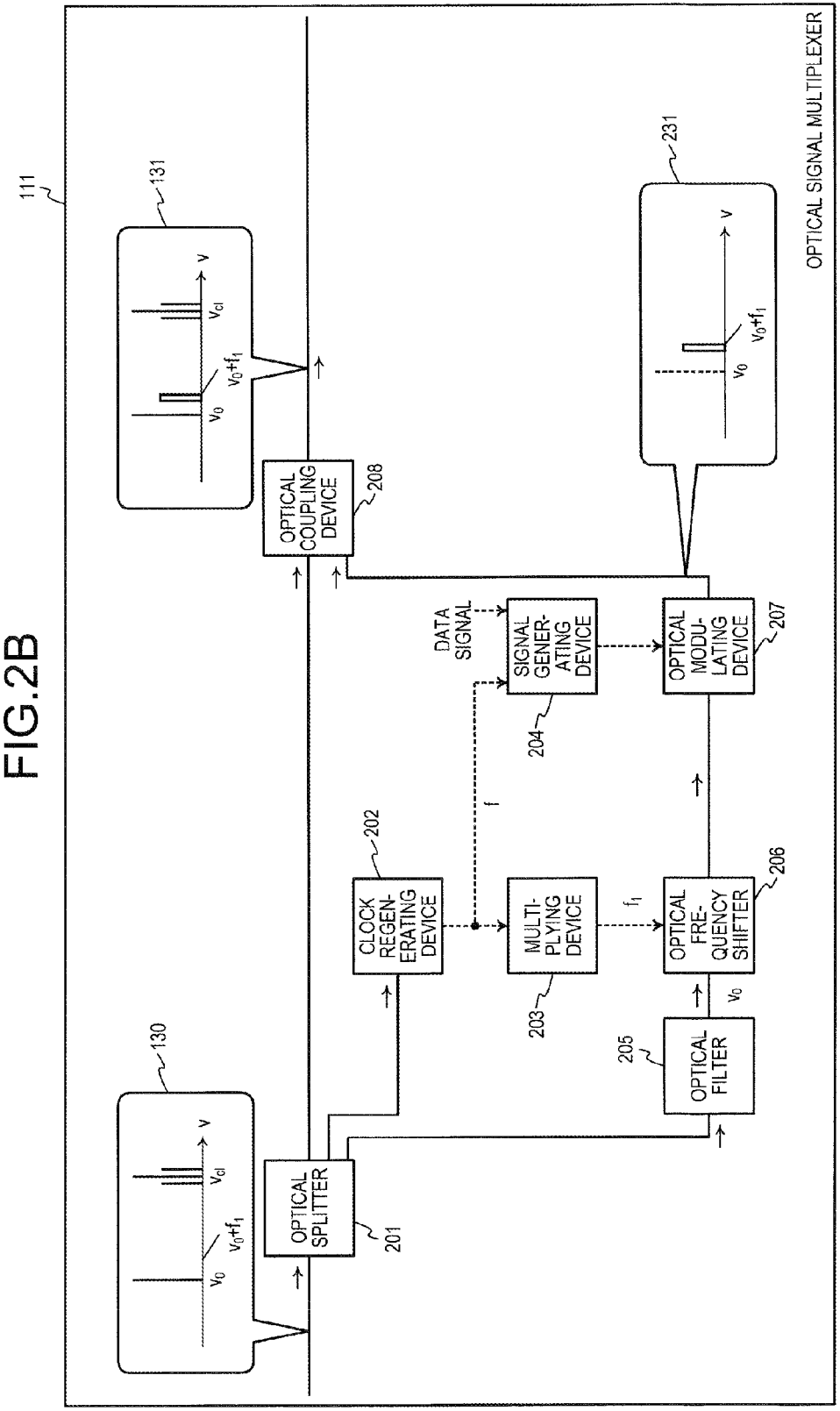
FIG. 2B is a diagram of an example of the flow of the light beams and the electrical signals in the optical signal multiplexer depicted in FIG. 2A.

FIG. 2A is a diagram of a specific configuration of the optical signal multiplexer at the first stage. FIG. 2B is a diagram of an example of the flow of the light beams and the electrical signals in the optical signal multiplexer depicted in FIG. 2A. As depicted in FIGS. 2A and 2B, the optical signal multiplexer 111 includes an optical splitter 201, a clock regenerating device 202, a multiplying device 203, a signal generating device 204, an optical filter 205, an optical frequency shifter 206, an optical modulating device 207, and an optical coupling device 208.

The optical splitter 201 receives input of the light beam output from the optical coupling device 104 (see, for example, FIGS. 1A and 1B). As represented by a spectrum 130, the light beam input into the optical splitter 201 includes the continuous wave light beam of the frequency v0 and the clock signal of the wavelength of vcl. The optical splitter 201 branches the light beam input thereto and outputs the resulting light beam branches. For example, the optical splitter 201 outputs the light beam output from the optical coupling device 104, to the clock regenerating device 202, the optical filter 205, and the optical coupling device 208.

The clock regenerating device 202 regenerates the clock signal at the frequency f from the light beam output from the optical splitter 201 and outputs the regenerated clock signal of the frequency f to the multiplying device 203 and the signal generating device 204. The multiplying device 203 multiplies the frequency f of the clock signal output from the clock regenerating device 202. For example, the multiplying device 203 of the optical signal multiplexer 111 at the first stage multiplies the frequency f by one and outputs the clock signal at the frequency multiplied by one f1 (=f×1) to the optical frequency shifter 206.

The signal generating device 204, using the clock signal output from the clock regenerating device 202, generates a driving signal at the frequency f based on the data signal input thereto and outputs the generated driving signal to the optical modulating device 207.

The optical filter 205 transmits only the light beam of the frequency v0 among the light beams output from the optical splitter 201 and outputs the light beam to the optical frequency shifter 206. Thereby, the optical filter 205 can output the continuous wave light beam of the frequency v0 and generated by the CW light source 101 (see, for example, FIGS. 1A and 1B) to the optical frequency shifter 206.

The optical frequency shifter 206, using the clock signal at the frequency f1 output from the multiplying device 203, executes frequency shifting for the frequency v0 of the continuous wave light beam that is output from the optical filter 205 and to be converted to the frequency v0+f1; and outputs the continuous wave light beam for which the frequency shifting is executed, to the optical modulating device 207. The optical frequency shifter 206 may be, for example, an optical frequency shifter configured by an optical IQ modulating device driven by a sine wave under a single side band (SSB) condition; an optical frequency shifter that extracts a desired frequency component from the output of an optical comb generator using an optical filter; etc. Residual spectrum components may be removed using an injection locking laser to remove the residual spectrum components caused by the imperfection of each of the optical filter 205 and the optical frequency shifter 206.

The optical modulating device 207, using the driving signal output from the signal generating device 204, modulates the continuous wave light beam of the frequency v0+f1 output from the optical frequency shifter 206 and outputs the optical signal resulting from the modulation to the optical coupling device 208. The optical signal output from the optical modulating device 207 is the optical signal of the frequency v0+f1 as represented by a spectrum 231.

The optical coupling device 208 couples the light beam output from the optical splitter 201 and the optical signal output from the optical modulating device 207. Thereby, the optical signal of the frequency v0+f1 can be added to the light beam input to the optical signal multiplexer 111 at the first stage. The optical coupling device 208 outputs the coupled light beam to the optical signal multiplexer 112 (see, for example, FIGS. 1A and 1B) downstream thereof. The light beam output from the optical coupling device 208 is a light beam formed by adding the optical signal of the frequency v0+f1 to the components represented by the spectrum 130, as represented by the spectrum 131.

Figure 3A:
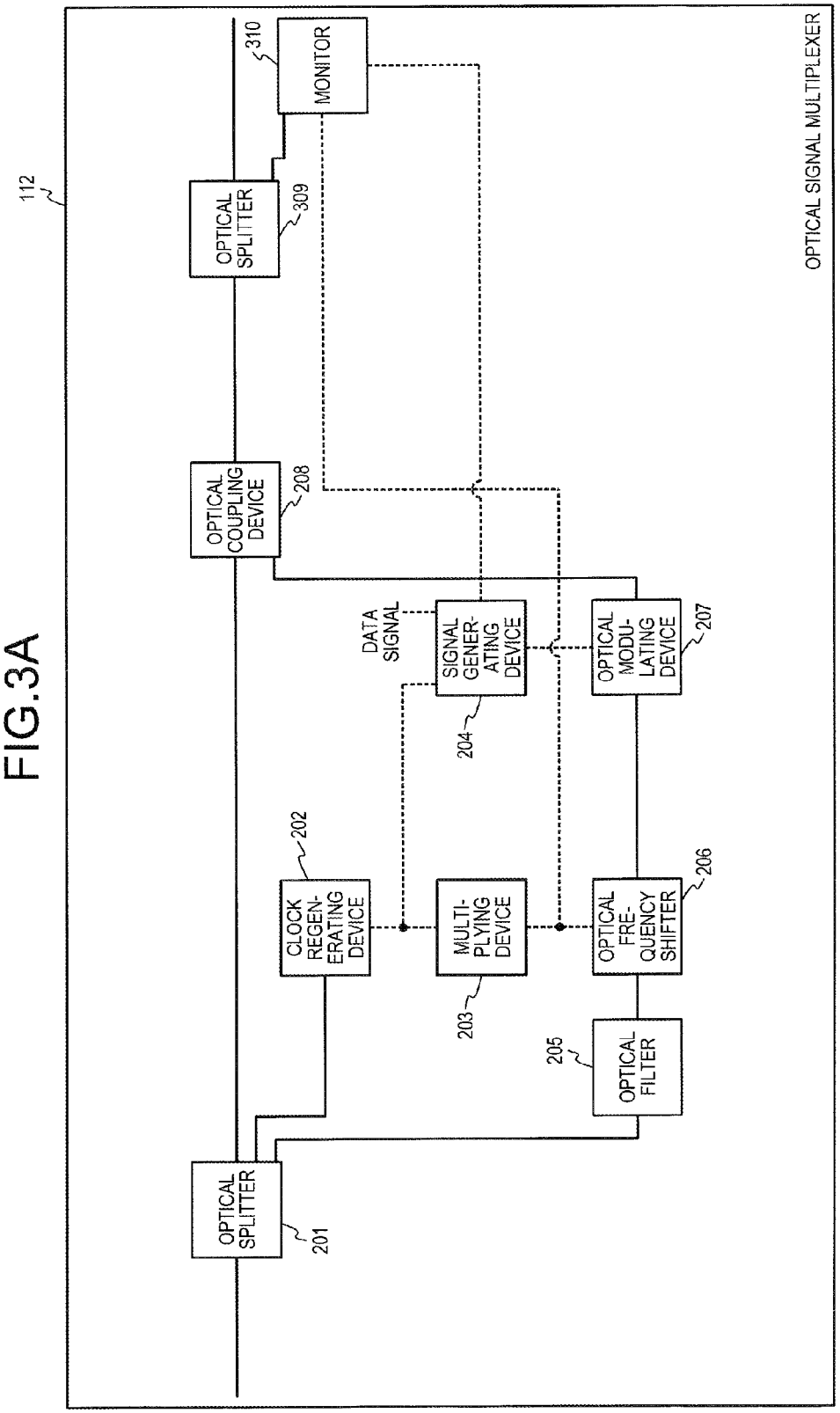
FIG. 3A is a diagram of a specific configuration of a optical signal multiplexer at a second stage.

FIG. 3A is a diagram of a specific configuration of the optical signal multiplexer at the second stage. FIG. 3B is a diagram of an example of the flow of light beams and electrical signals in the optical signal multiplexer depicted in FIG. 3A. In FIGS. 3A and 3B, components identical to those depicted in FIGS. 2A and 2B are given the same reference numerals used in FIGS. 2A and 2B and will not again be described. As depicted in FIGS. 3A and 3B, the optical signal multiplexer 112 includes an optical splitter 309 and a monitor 310 in addition to the configuration of the optical signal multiplexer 111 depicted in FIGS. 2A and 2B.

The optical splitter 201 of the optical signal multiplexer 112 receives input of the light beam output from the optical signal multiplexer 111 at the first stage (see, for example, FIGS. 1A and 1B). The light beam input into the optical splitter 201 of the optical signal multiplexer 112 includes a continuous wave light beam of the frequency v1, the optical signal of the frequency v0+f1, formed by the multiplexing by the optical signal multiplexer 111 at the previous stage thereof and a clock signal of the frequency vc1 as represented by the spectrum 131.

The multiplying device 203 of the optical signal multiplexer 112 in the second stage multiplies the frequency f of the clock signal output from the clock regenerating device 202 by two and outputs the clock signal of a frequency f2 (=f×2) obtained by multiplying the frequency f by two, to the optical frequency shifter 206 and the monitor 310.

The signal generating device 204 adjusts the timing to output the driving signal to the optical modulating device 207 based on the information indicating an amount of shift of the orthogonality output from the monitor 310. For example, the signal generating device 204 adjusts the timing to output the driving signal to reduce the amount of shift of the orthogonality.

The optical frequency shifter 206, using the clock signal at the frequency f2 output from the multiplying device 203, executes frequency shifting to convert the frequency v0 of the continuous wave light beam output from the optical filter 205 into the frequency v0+f2.

The optical modulating device 207, using the driving signal output from the signal generating device 204, modulates the continuous wave light beam of the frequency v0+f2 output from the optical frequency shifter 206 and outputs the optical signal resulting from the modulation to the optical coupling device 208. The optical signal output from the optical modulating device 207 is the optical signal of the frequency v0+f2 as represented by a spectrum 331.

The coupling device 208 couples the light beam output from the optical splitter 201 and the optical signal output from the optical modulating device 207. Thereby, the optical signal of the frequency v0+f2 can be added to the light beam input into the optical signal multiplexer 112. The optical coupling device 208 outputs the coupled light beam to the optical splitter 309. The light beam output from the optical coupling device 208 is a light beam formed by adding the optical signal of the frequency v0+f2 to the components represented by the spectrum 131 as represented by the spectrum 132.

The optical splitter 309 branches the light beam output from the optical coupling device 208 and outputs the resulting light beam branches. For example, the optical splitter 309 outputs the light beam output from the optical coupling device 208, to the optical signal multiplexer (113) in the post-stage and the monitor 310.

The monitor 310 receives (demodulates) the optical signal multiplexed by the optical coupling device 208 of the optical signal multiplexer 112 and the optical signal multiplexed by the optical signal multiplexer 111 at the previous stage thereof, from the light beam output from the optical splitter 309. For example, the monitor 310 executes the reception (demodulation) using the clock signal of the frequency f2 output from the multiplying device 203. The monitor 310 detects the amount of shift of the orthogonality in the orthogonal frequency division multiplexing of the received optical signals, and outputs information indicating the detected amount of shift of the orthogonality, to the signal generating device 204.

The optical coupling device 208 can implement a multiplexing unit that multiplexes a second optical signal (of, for example, the frequency v0+f2) whose frequency is adjacent to that of a first optical signal (having, for example, the frequency v0+f1) included in the signal light beam to be multiplexed, with the signal light beam to be multiplexed. The monitor 310 can implement a monitoring unit that monitors a deviation between the timings of the first and the second optical signals. The signal generating device 204 can implement an adjusting unit that adjusts the timing of the second optical signal based on the result of the monitoring of the deviation between the timings of the first and the second optical signals.

The clock regenerating device 202 can implement an acquiring unit that acquires the clock signal common to the plural multiplexers 112 to 11N. The signal generating device 204 can implement a generating unit that generates and outputs a data signal based on the clock signal. The optical modulating device 207 can implement a modulating unit that acquires the second optical signal by modulating the continuous wave light beam at the frequency that is adjacent to the frequency of the first optical signal based on the generated data signal.

The optical filter 205 can implement an extracting unit that extracts the continuous wave light beam (having, for example, the frequency v0) included in the signal light beam (having, for example, the frequency v0+f2) to be multiplexed. The optical frequency shifter 206 can implement a shifting unit that shifts the frequency of the extracted continuous wave light beam using the plural optical signal multiplexers 112 to 11N each by an amount that is different from that of each other (for example, a frequency f2). The multiplying device 203 can implement a multiplying unit that multiplies the frequency of the acquired clock signal using the plural optical signal multiplexers 112 to 11N each by a multiplying factor that is different from that of each other.

Figure 4A:
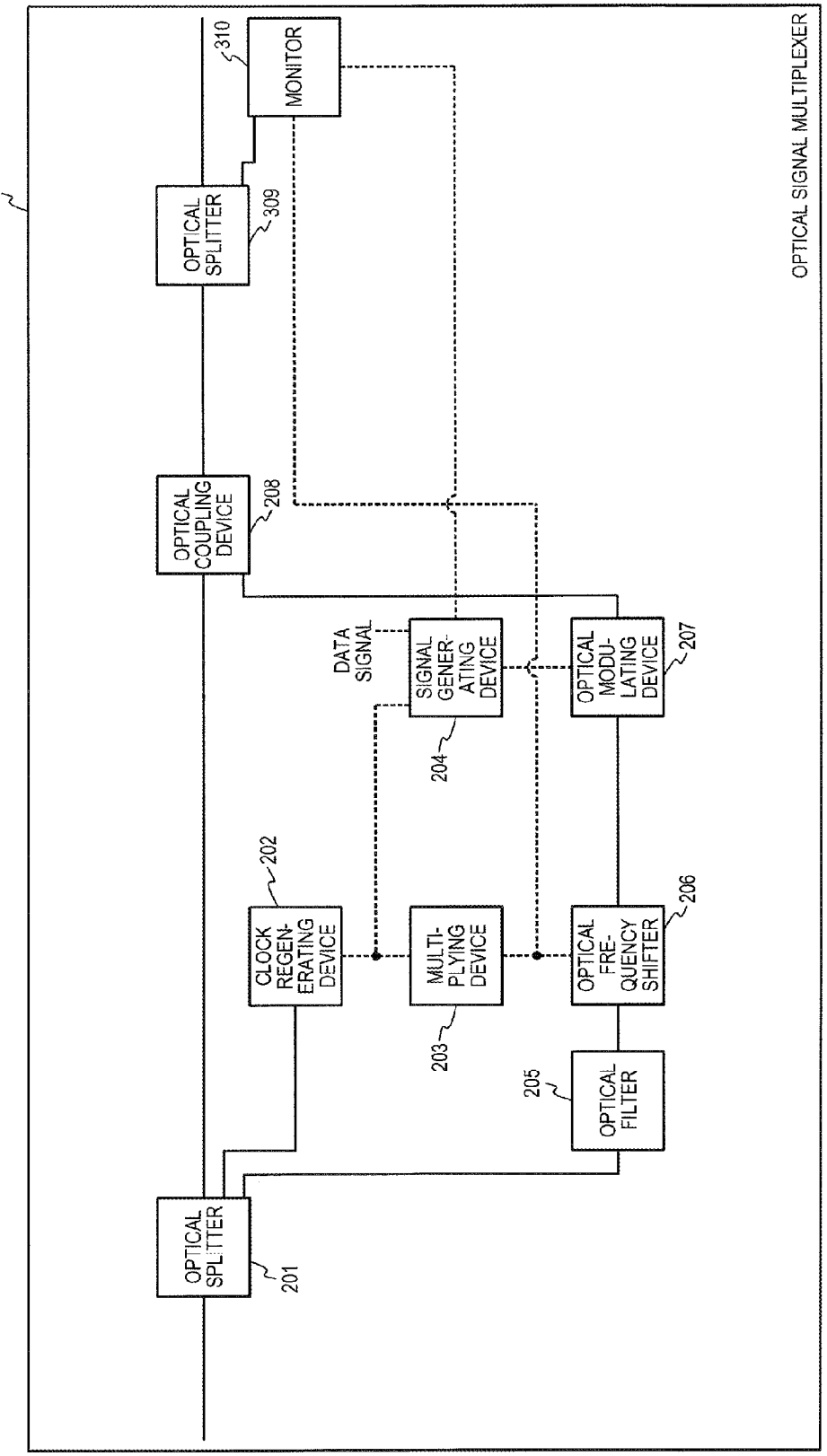
FIG. 4A is a diagram of a specific configuration of the optical signal multiplexer at an N-th stage.
Figure 4B:
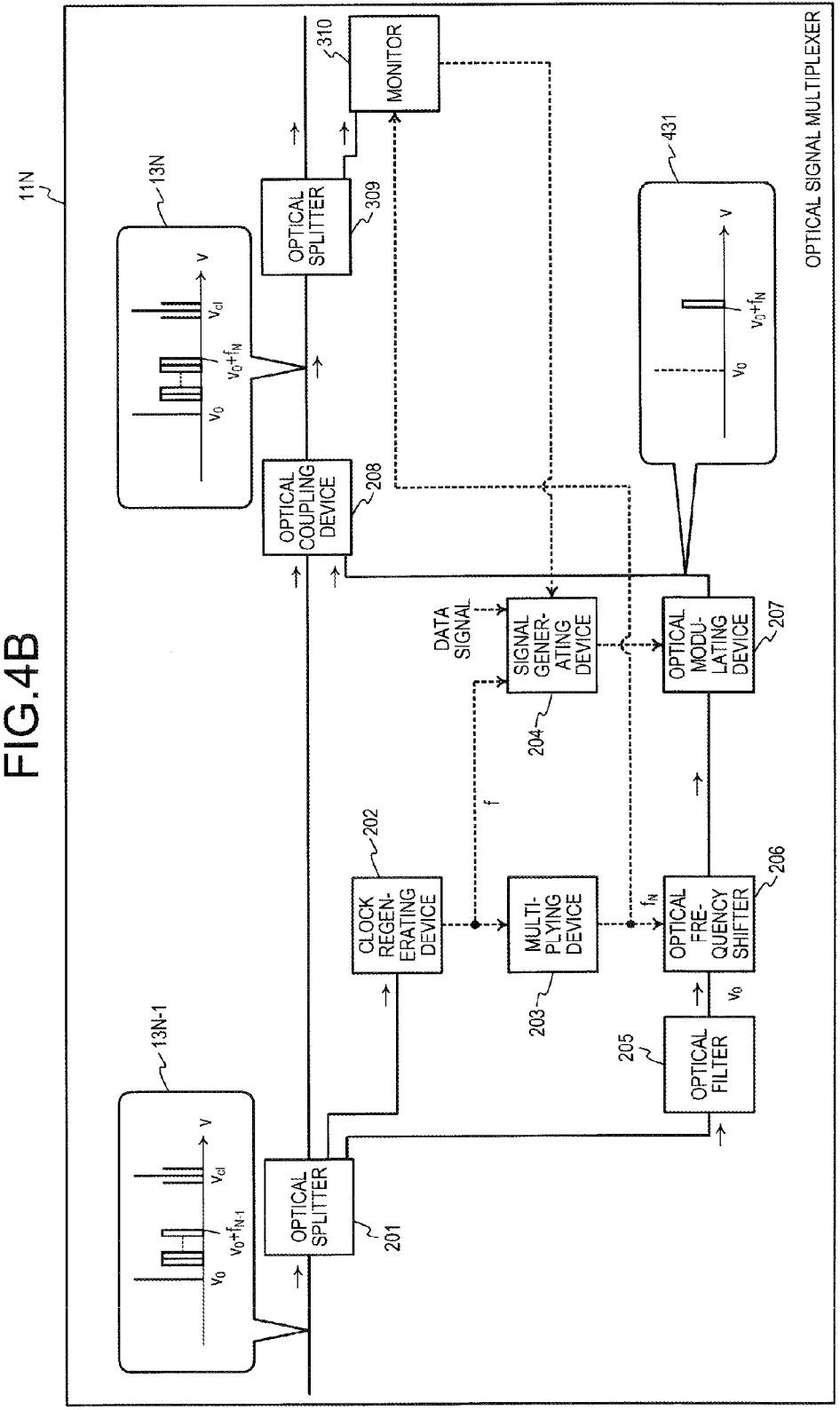
FIG. 4B is a diagram of an example of the flow of light beams and electrical signals in the optical signal multiplexer depicted in FIG. 4A.

FIG. 4A is a diagram of a specific configuration of the optical signal multiplexer at the N-th stage. FIG. 4B is a diagram of an example of the flow of light beams and electrical signals in the optical signal multiplexer depicted in FIG. 4A. In FIGS. 4A and 4B, components identical to those depicted in FIGS. 2A to 3B are given the same reference numerals used in FIGS. 2A to 3B and will not again be described.

As depicted in FIGS. 4A and 4B, the optical splitter 201 of the optical signal multiplexer 11N receives input of the light beam output from the optical signal multiplexer 11(N−1) at the previous stage thereof. The light beam input into the optical splitter 201 of the optical signal multiplexer 11N includes the continuous wave light beam of the frequency v0, the optical signal of the frequency v0+fN−1 multiplexed by the optical signal multiplexer 11(N−1) at the previous stage, and the clock signal of the frequency vcl, as represented by a spectrum 13(N−1).

The multiplying device 203 of the optical signal multiplexer 11N in the N-th stage multiplies the frequency f by N and outputs to the optical frequency shifter 206 and the monitor 310, the clock signal at the frequency fN (=f×N) resulting from the multiplication by N.

The optical frequency shifter 206, using the clock signal at the frequency fN output from the multiplying device 203, executes frequency shifting that converts the frequency v0 of the continuous wave light beam output from the optical filter 205 into the frequency v0+fN.

The optical modulating device 207, using the driving signal output from the signal generating device 204, modulates the continuous wave light beam of the frequency v0+fN output from the optical frequency shifter 206 and outputs the optical signal resulting from the modulation to the optical coupling device 208. The optical signal output from the optical modulating device 207 is an optical signal of the frequency v0+fN as represented by a spectrum 431.

The optical coupling device 208 couples the light beam output from the optical splitter 201 and the optical signal output from the optical modulating device 207. Thereby, the optical signal of the frequency v0+fN can be added to the light beam input into the optical signal multiplexer 11N. The optical coupling device 208 outputs the coupled light beam to the optical splitter 309. The light beam output from the optical coupling device 208 is a light beam formed by adding the optical signal of the frequency v0+fN to the components represented by the spectrum 13(N−1), as represented by the spectrum 13N.

The optical splitter 309 branches the light beam output from the optical coupling device 208 and outputs the resulting light beam branches. For example, the optical splitter 309 outputs the light beam output from the optical coupling device 208, to an optical receiving apparatus not depicted and the monitor 310.

Figure 5A:
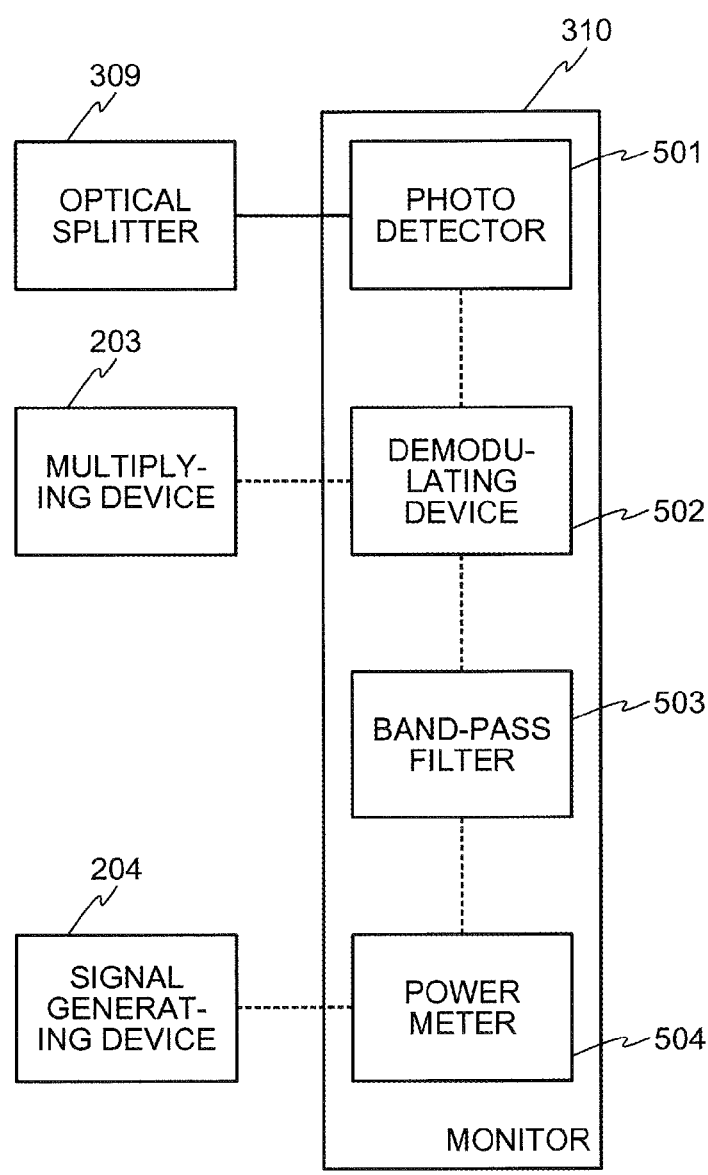
FIG. 5A is a diagram of a specific configuration of an optical monitor of the optical signal multiplexer at a k-th stage.
Figure 5B:
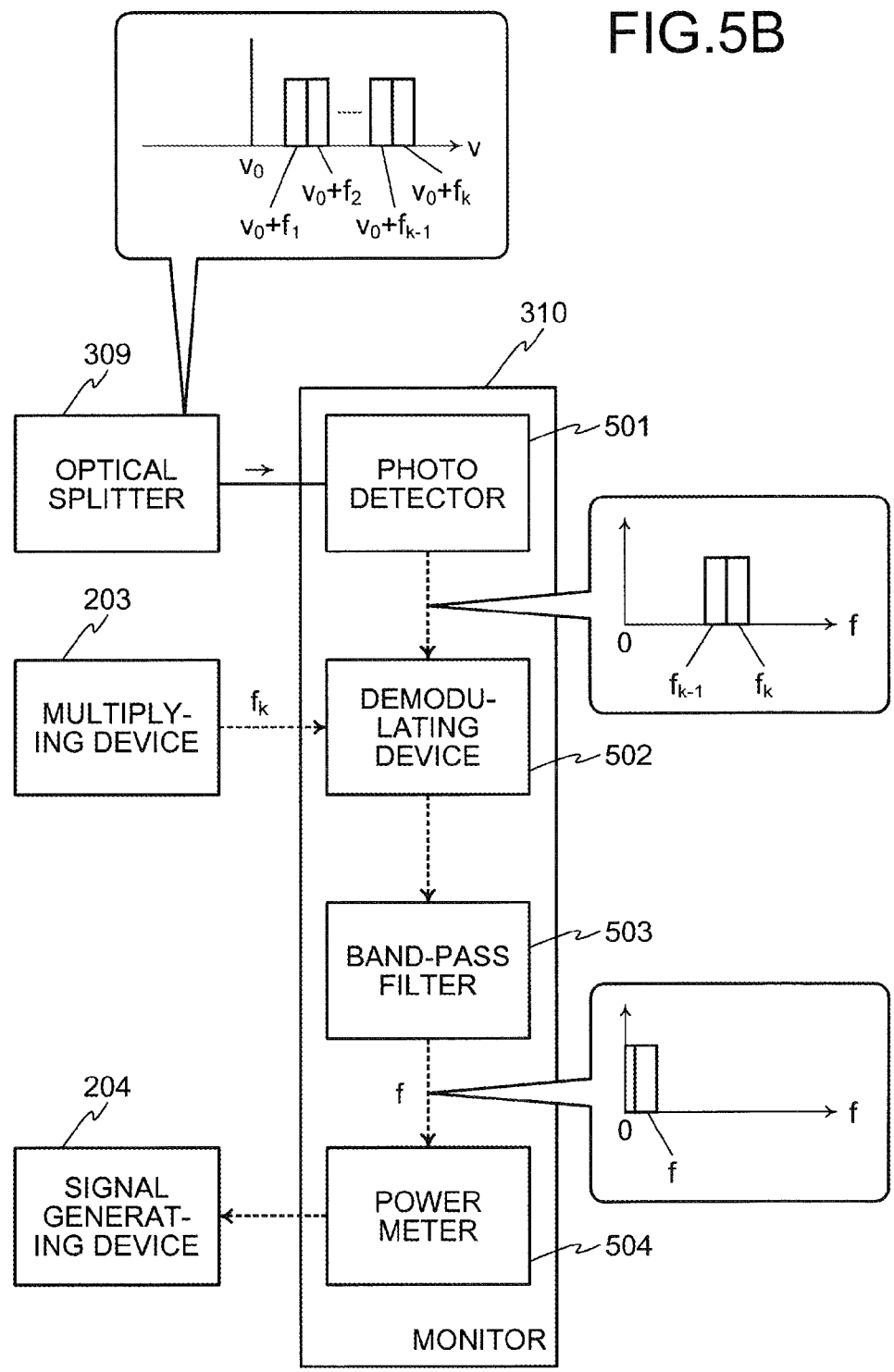
FIG. 5B is a diagram of an example of the flow of light beams and electrical signals in the optical monitor depicted in FIG. 5A.

FIG. 5A is a diagram of a specific configuration of the optical monitor of the optical signal multiplexer at the k-th stage. FIG. 5B is a diagram of an example of the flow of light beams and electrical signals in the optical monitor depicted in FIG. 5A. In FIGS. 5A and 5B, components identical to those depicted in FIGS. 2A to 4B are given the same reference numerals used in FIGS. 2A to 4B and will not again be described. As depicted in FIGS. 5A and 5B, the optical monitor 310 includes photo detector 501, a demodulating device 502, a band-pass filter 503, and a power meter 504.

The photo detector 501 in the optical signal multiplexer at the k-th (2≤k≤N) stage of the optical signal multiplexers 112 to 11N executes photo-electric conversion for the components of the frequencies fk−1 and fk of the light beam output from the optical splitter 309, and outputs an electrical signal obtained by the photo-electric conversion to the demodulating device 502. The demodulating device 502, using the clock signal at the frequency fk output from the multiplying device 203, executes frequency conversion for the electrical signal output from the photo detector 501 and outputs the frequency-converted signal to the band-pass filter 503.

The band-pass filter 503 extracts from the signal output from the demodulating device 502, an adjacent channel component (at the frequency f) that corresponds to the adjacent frequency fk−1 and outputs the extracted signal component at the frequency f to the power meter 504. The power meter 504 measures the electric power of the signal component at the frequency f output from the band-pass filter 503, and outputs the result of the measurement to the signal generating device 204 as information indicating the amount of shift of the orthogonality in the orthogonal frequency division multiplexing of each of the optical signals.

A case has been described where the result of the measurement of the electric power of the adjacent channel component of the signal output from the demodulating device 502 is output as the information indicating the amount of shift. However, an error may be measured in the demodulation executed by the demodulating device 502 and the result of the error measurement may be output as the information indicating the amount of shift. The result of the error measurement is, for example, a bit error rate (BER).

As described, such orthogonality is monitored for each of the optical signal multiplexers 112 to 11N as that between the optical signal to be multiplexed and the optical signal disposed at the frequency (wavelength) adjacent to the frequency (wavelength) of the optical signal to be multiplexed. Thereby, the deviation can be adjusted between the timings of the optical signal to be multiplexed and the optical signal whose frequency is adjacent to that of the optical signal to be multiplexed.

Figure 6B:
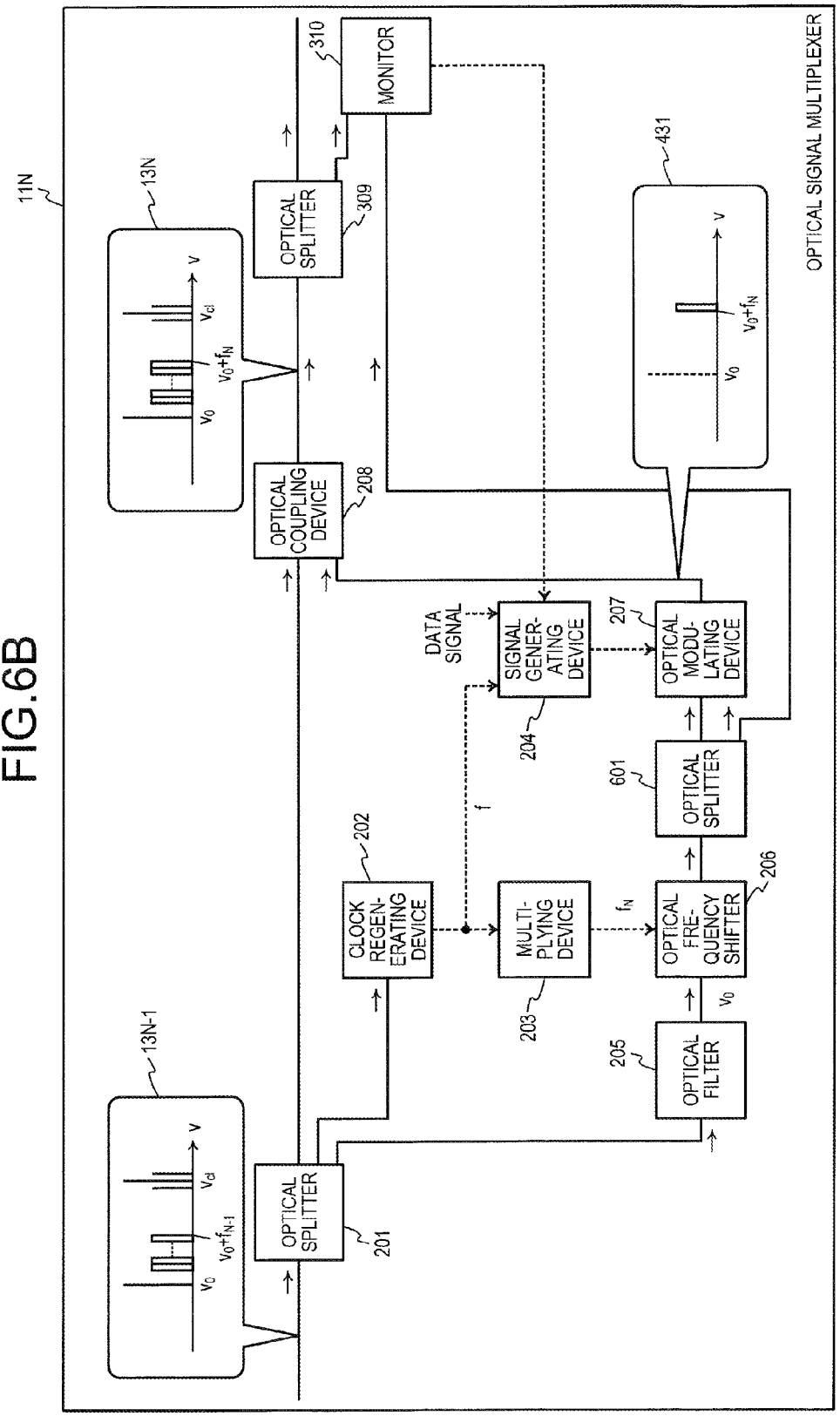
FIG. 6B is a diagram of an example of the flow of light beams and electrical signals in the optical signal multiplexer depicted in FIG. 6A.

FIG. 6A is a diagram of another example of a specific configuration of the optical signal multiplexer at the N-th stage. FIG. 6B is a diagram of an example of the flow of light beams and electrical signals in the optical signal multiplexer depicted in FIG. 6A. In FIGS. 6A and 6B, components identical to those depicted in FIGS. 2A to 4B are given the same reference numerals used in FIGS. 2A to 4B and will not again be described.

As depicted in FIGS. 6A and 6B, the optical signal multiplexer 11N includes an optical splitter 601 in addition to the optical signal multiplexer 11N depicted in FIG. 4A. The multiplying device 203 outputs to the optical frequency shifter 206, the clock signal at the frequency fN (=f×N) multiplied by N. The optical frequency shifter 206 outputs to the optical splitter 601, the continuous wave light beam for which the optical frequency shifter 206 executes the frequency shifting. The optical splitter 601 outputs to the optical modulating device 207 and the monitor 310, the continuous wave light beam of the frequency v0+fN output from the optical frequency shifter 206. The optical modulating device 207, using the driving signal output from the signal generating device 204, modulates the continuous wave light beam of the frequency v0+fN output from the optical splitter 601.

The monitor 310 receives (demodulates) the optical signal multiplexed by the optical coupling device 208 of the optical signal multiplexer 11N and the optical signal multiplexed by the optical signal multiplexer 11(N−1) at the previous stage thereof, using the continuous wave light beam at the frequency v0+fN output from the optical splitter 601.

Figure 7B:
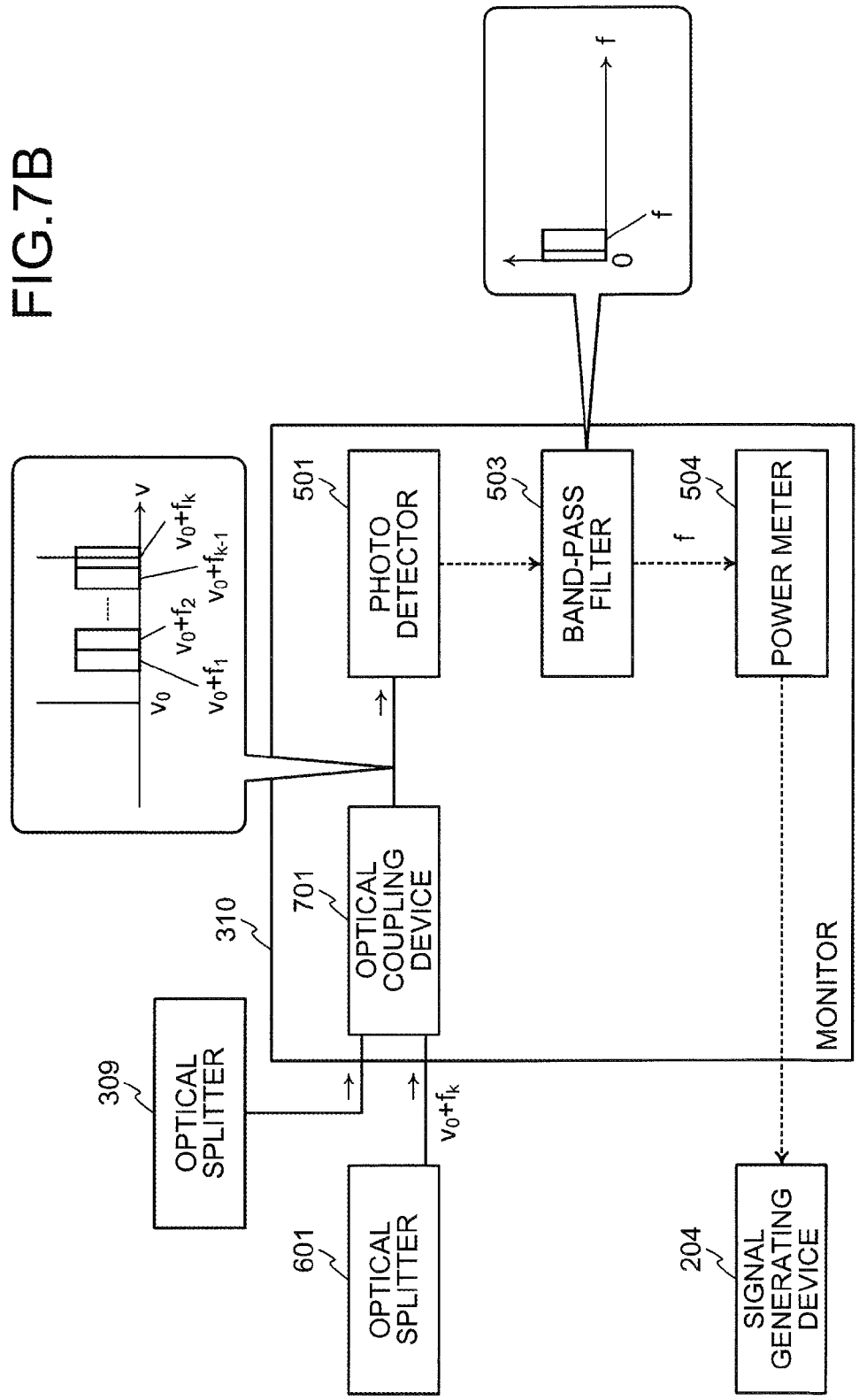
FIG. 7B is a diagram of an example of the flow of light beams and electrical signals in the optical monitor depicted in FIG. 7A.

FIG. 7A is a diagram of another example of a specific configuration of the optical monitor 310 of the optical signal multiplexer at the k-th stage. FIG. 7B is a diagram of an example of the flow of light beams and electrical signals in the optical monitor depicted in FIG. 7A. In FIGS. 7A and 7B, components identical to those depicted in FIGS. 5A and 5B are given the same reference numerals used in FIGS. 5A and 5B and will not again be described. As depicted in FIGS. 7A and 7B, the optical monitor 310 includes the photo detector 501, the band-pass filter 503, the power meter 504, and an optical coupling device 701.

The optical coupling device 701 couples the light beam output from the optical splitter 309 and the continuous wave light beam of the frequency ν0+fk output from the optical splitter 601, and outputs the coupled light beam to the photo detector 501.

The photo detector 501 executes photo-electric conversion for the components at frequencies fk−1 and fk from the light beam output from the optical coupling device 701, and outputs an electrical signal acquired by the photo-electric conversion to the band-pass filter 503. The band-pass filter 503 extracts from the electrical signal output from the photo detector 501, an adjacent channel component (at the frequency f) that corresponds to the adjacent frequency fk−1 and outputs the extracted frequency f to the power meter 504.

The power meter 504 measures the electric power of the signal component at the frequency f output from the band-pass filter 503, and outputs the result of the measurement of the electric power to the signal generating device 204 as the information indicating the amount of shift of the orthogonality in the orthogonal frequency division multiplexing of each of the optical signals.

As described, according to the optical transmission system 100 according to the first embodiment, the optical signal multiplexers 112 to 11N connected in series sequentially multiplex the optical signals respectively of one wavelength and thereby, the wavelength-multiplexed signal light beam can be acquired. Each of the optical signal multiplexers 112 to 11N monitors the band of the multiplexed optical signal and the band of the optical signal that is adjacent to the multiplexed optical signal and thereby, the timings of the optical signals to be multiplexed are adjusted. Thus, the deviation between the timings of the band of the multiplexed optical signal and the band of the optical signal that is adjacent to the multiplexed optical signal can be reduced. Consequently, cross-talk between the optical signals can be suppressed.

The optical signal multiplexers 112 to 11N only have to monitor the band of the multiplexed optical signal and the band of the optical signal that is adjacent to the multiplexed optical signal and therefore, a narrow band monitor can be employed. Cross-talk can be suppressed between the optical signals even when no wide-band monitor is used, as used in, for example, a configuration to collectively receive all the optical signals acquired after the multiplexing and monitor the timings of the optical signals.

Each of the optical signal multiplexers 112 to 11N only has to adjust the timing of the optical signal to be multiplexed to the timing of the optical signal that is adjacent to the optical signal to be multiplexed. Therefore, the temporal timings can easily be matched with each other and the electrical control can be simplified compared to those of the configuration to collectively receive all the optical signals and collectively control the timings of all the optical signals.

The optical signal can be generated and multiplexed by the modulation based on the data signal generated using the clock signal that is common to the plural optical signal multiplexers 112 to 11N. Thus, the optical signal multiplexers 112 to 11N connected in series can multiplex the optical signals mutually matching the timings. The adjustment of the timing at which the data signal is output from the signal generating device 204 to the optical modulating device 207 enables the adjustment of the timing of the optical signal to be multiplexed.

Each of the plural optical signal multiplexers 112 to 11N can extract the continuous wave light beam at the predetermined frequency (the frequency ν0) included in the signal light beam input thereto and can modulate the frequency of the extracted continuous wave light beam after shifting the frequency by the optical signal multiplexers 112 to 11N respectively by an amount that is different from that of each other. Thus, the optical signal multiplexers 112 to 11N can each generate and multiplex the optical signal of a wavelength that is different from that of each other.

The clock signal common to the optical signal multiplexers 112 to 11N can be multiplied by the optical signal multiplexers 112 to 11N respectively by a multiplying factor that is different from that of each other and the frequency of the continuous wave light beam of the frequency ν0 can be shifted based on the multiplied clock signals. Thus, the frequency can be shifted by the optical signal multiplexers 112 to 11N each by an amount that is different from that of each other.

In the description, a case has been described where each of the optical signal multiplexers 112 to 11N multiplexes an optical signal whose wavelength is longer than that multiplexed at the previous stage as the optical signal of the wavelength that is adjacent to the wavelength multiplexed at the previous stage. However, the optical signal multiplexers 112 to 11N may each multiplex an optical signal whose wavelength is shorter than the wavelength multiplexed at the previous stage.

In the description, a case has also been described where each of the optical signal multiplexers 112 to 11N multiplexes the optical signal of the wavelength adjacent to the wavelength that is immediately previously multiplexed. However, the optical signal multiplexers 112 to 11N may respectively multiplex an optical signal of the wavelength adjacent to the wavelength that is multiplexed two or more stages before.

In the description, a case has also been described where the optical coupling device 104 depicted in FIGS. 1A and 1B couples the optical clock signal and each of the optical signal multiplexers 111 to 11N regenerates the clock signal at the frequency f using the clock regenerating device 202. However, a radio transmitter may transmit by radio, the clock signal at the frequency f that is common to the optical signal multiplexers 111 to 11N and the optical signal multiplexers 111 to 11N may receive the clock signal transmitted by radio.

A second embodiment of the optical transmission system will be described. In the second embodiment, a case will be described where the optical signal multiplexers 111 to 11N each include a non-linear optical medium, and description will be made for portions that are different from the first embodiment.

Figure 8B:
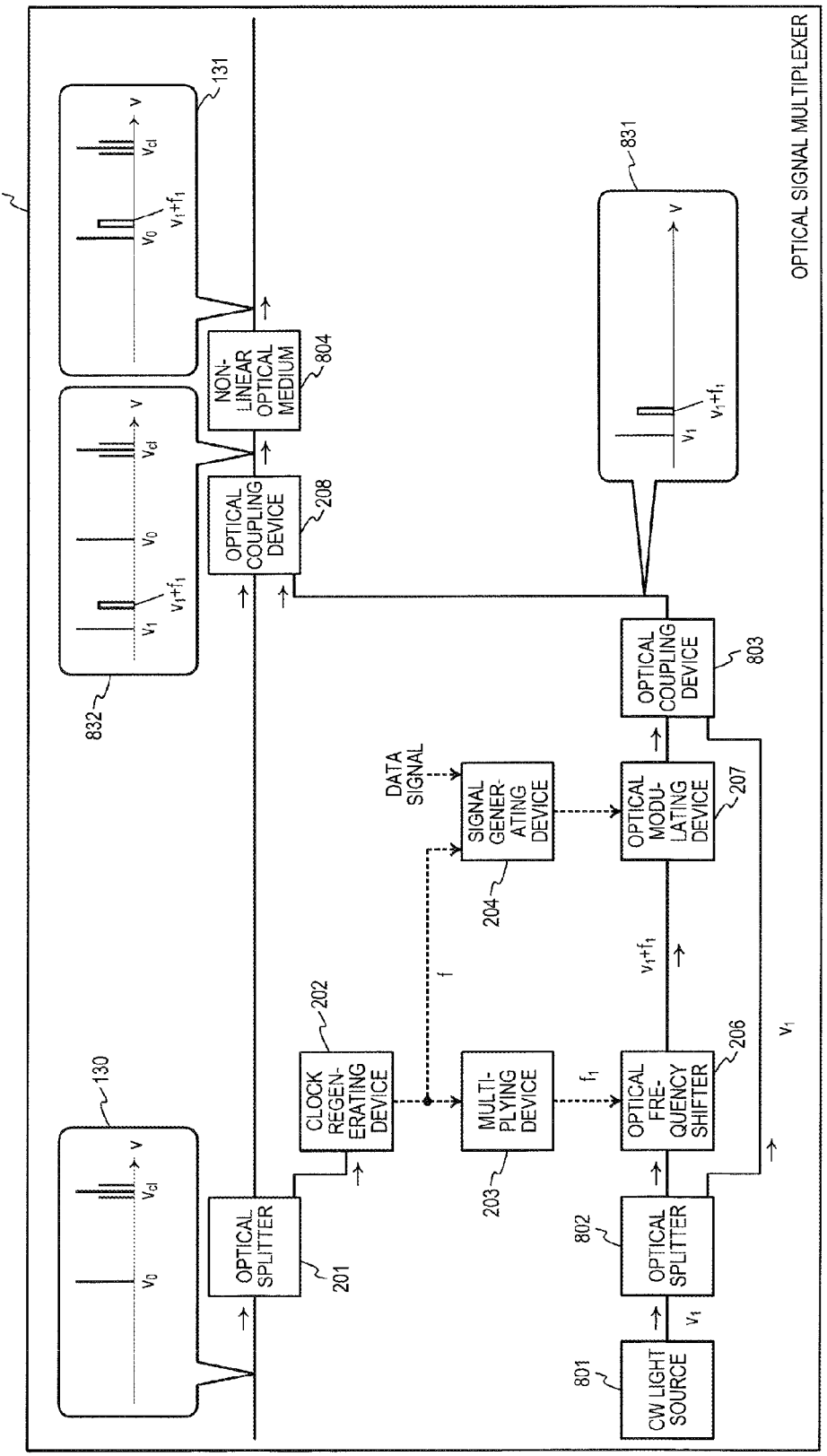
FIG. 8B is a diagram of an example of the flow of light beams and electrical signals in the optical transmitting apparatus depicted in FIG. 8A.

FIG. 8A is a diagram of a specific configuration of an optical transmitting apparatus according to the second embodiment. FIG. 8B is a diagram of an example of the flow of light beams and electrical signals in the optical transmitting apparatus depicted in FIG. 8A. As depicted in FIGS. 8A and 8B, the optical signal multiplexer 111 includes the optical splitter 201, the clock regenerating device 202, the multiplying device 203, the signal generating device 204, the optical frequency shifter 206, the optical modulating device 207, the optical coupling device 208, a CW light source 801, an optical splitter 802, an optical coupling device 803, and the non-linear optical medium 804.

The optical splitter 201 outputs the light beam output from the optical coupling device 104 (see, for example, FIGS. 1A and 1B) to the clock regenerating device 202 and the optical coupling device 208. The CW light source 801 generates a continuous wave light beam having, for example, the frequency ν1 (≠ν0) and outputs the generated continuous wave light beam to the optical splitter 802. The optical splitter 802 branches the light beam output from the CW light source 801 and outputs the resulting light beam branches to the optical frequency shifter 206 and the optical coupling device 803.

The optical frequency shifter 206 executes frequency shifting to convert the frequency ν1 of the continuous wave light beam output from the optical splitter 802 into the frequency v1+f1 using the clock signal at the frequency f1 output from the multiplying device 203. The optical frequency shifter 206 outputs to the optical modulating device 207, the continuous wave light beam whose frequency is shifted.

The optical modulating device 207, using the driving signal output from the signal generating device 204, modulates the continuous wave light beam of the frequency v1+f1 output from the optical frequency shifter 206. The optical modulating device 207 outputs to the optical coupling device 803, the optical signal resulting from the modulation. The optical coupling device 803 couples the optical signal of the frequency v1+f1 output from the optical modulating device 207 and the continuous wave light beam of the frequency v1 output from the optical splitter 802, as represented by a spectrum 831, and outputs the coupled light beam to the optical coupling device 208.

The optical coupling device 208 couples the light beam output from the optical splitter 201 and the light beam output from the optical coupling device 803, and outputs the coupled light beam to the non-linear optical medium 804. The light beam output from the optical coupling device 208 is a light beam formed by adding the continuous wave light beam of the frequency v1 and the optical signal of the frequency v1+f1 to the components represented by the spectrum 130, as represented by a spectrum 832.

The non-linear optical medium 804 frequency-converts the optical signal of the frequency v1+f1 included in the light beam output from the optical coupling device 208, into the optical signal of the frequency v0+f1, and outputs the frequency-converted optical signal to the optical signal multiplexer 112 downstream (see, for example, FIGS. 1A and 1B). Thereby, the optical signal of the frequency v0+f1 can be added to the light beam input into the optical signal multiplexer 111, as represented by the spectrum 131.

The optical phase modulation based on cross-phase modulation, cross-gain modulation, an optical parametric amplification effect, optical intensity modulation executed by an optical Kerr switch, etc. can be employed as the optical intermodulation executed by the non-linear optical medium 804. For example, an optical fiber, cyclic polarization inverted lithium niobate, a semiconductor optical amplifier, and a high refractive-index contrast optical waveguide such as a silicon wire waveguide are usable as the non-linear optical medium 804.

Figure 9A:
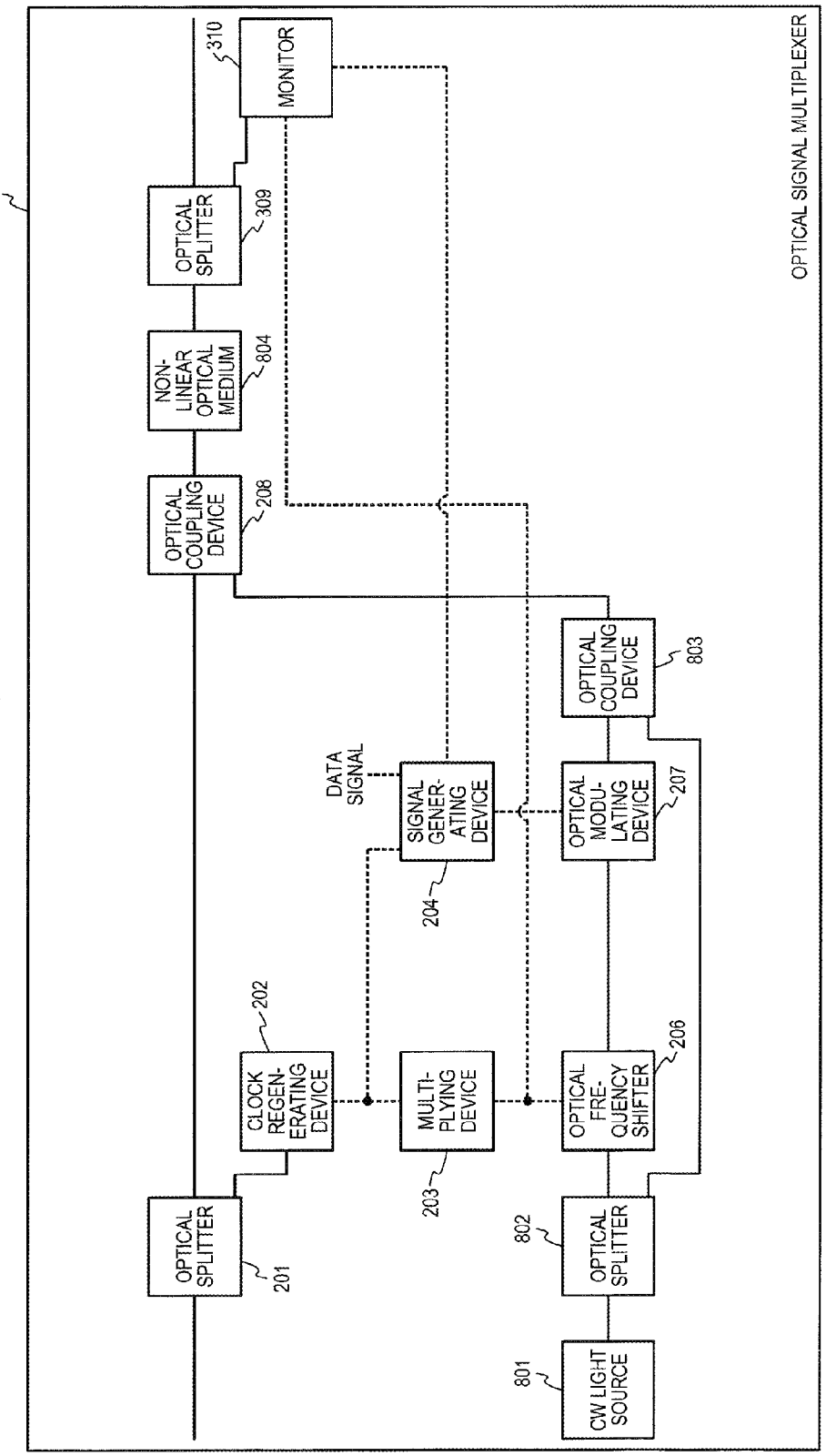
FIG. 9A is a diagram of a specific configuration of the optical signal multiplexer at the second stage.
Figure 9B:
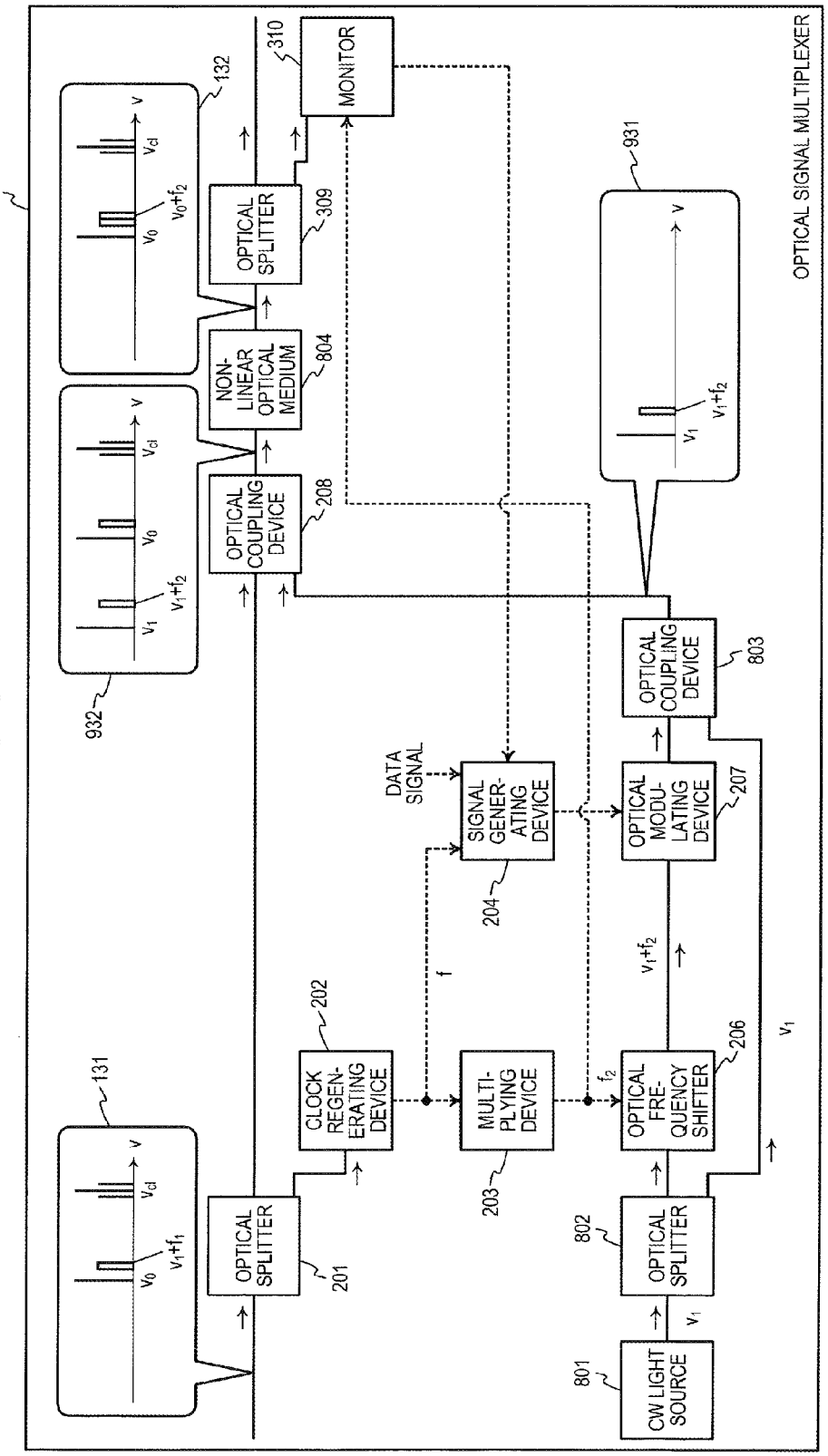
FIG. 9B is a diagram of an example of the flow of light beams and electrical signals in the optical signal multiplexer depicted in FIG. 9A.

FIG. 9A is a diagram of a specific configuration of the optical signal multiplexer at the second stage. FIG. 9B is a diagram of an example of the flow of light beams and electrical signals in the optical signal multiplexer depicted in FIG. 9A. In FIGS. 9A and 9B, components identical to those depicted in FIGS. 8A and 8B are given the same reference numerals used in FIGS. 8A and 8B and will not again be described. As depicted in FIGS. 9A and 9B, the optical signal multiplexer 112 includes the optical splitter 309 and the monitor 310 in addition to the configuration of the optical signal multiplexer 111 depicted in FIGS. 8A and 8B.

The optical frequency shifter 206 of the optical signal multiplexer 112, using the clock signal at the frequency f2 output from the multiplying device 203, executes frequency shifting to convert the frequency v1 of the continuous wave light beam output from the optical splitter 802 into the frequency v1+f2.

The optical modulating device 207, using the driving signal output from the signal generating device 204, modulates the continuous wave light beam of the frequency v1+f2 output from the optical frequency shifter 206 and outputs the optical signal resulting from the modulation to the optical coupling device 803. The optical coupling device 803 couples the optical signal of the frequency v1+f2 output from the optical modulating device 207 and the continuous wave light beam of the frequency v1 output from the optical splitter 802, as represented by a spectrum 931, and outputs the coupled light beam to the optical coupling device 208.

The optical coupling device 208 outputs the coupled light beam to the non-linear optical medium 804. The light beam output from the optical coupling device 208 is a light beam formed by adding the continuous wave light beam of the frequency v1 and the optical signal of the frequency v1+f2 to the components represented by the spectrum 131, as represented by a spectrum 932.

The non-linear optical medium 804 frequency-converts the optical signal of the frequency v1+f2 included in the light beam output from the optical coupling device 208 into an optical signal of the frequency v0+f2, and outputs the frequency-converted optical signal to the optical signal multiplexer (113) in the post-stage. Thereby, the optical signal of the frequency v0+f2 can be added to the light beam output from the optical signal multiplexer 111, as represented by the spectrum 132.

The CW light source 801 can implement a light source that generates the continuous wave light beam at a predetermined frequency (the frequency v1). The predetermined frequency is, for example, a frequency common to the optical signal multiplexers 112 to 11N. The optical frequency shifter 206 can implement a shifting unit that shifts the frequency of the continuous wave light beam generated by the light source using the plural multiplexers each by an amount (the frequency f2) that is different from that of each other. The optical coupling device 803 can implement a coupling unit that couples the optical signal (having the frequency v0+f2) obtained by the modulation and the continuous wave light beam (having the frequency v1) generated by the light source.

The optical coupling device 208 can implement a multiplexing unit that couples the signal light beam (of the frequency v0+f1) to be multiplexed and the signal light beams (of the frequencies v1 and v1+f2) that are coupled by the coupling device 803. The non-linear optical medium 804 can implement a multiplexing unit that multiplexes the second optical signal (having the frequency v0+f2) with the signal light beam (having the frequency v0+f1) to be multiplexed by causing the coupled signal light beam to pass through the non-linear optical medium.

Figure 10A:
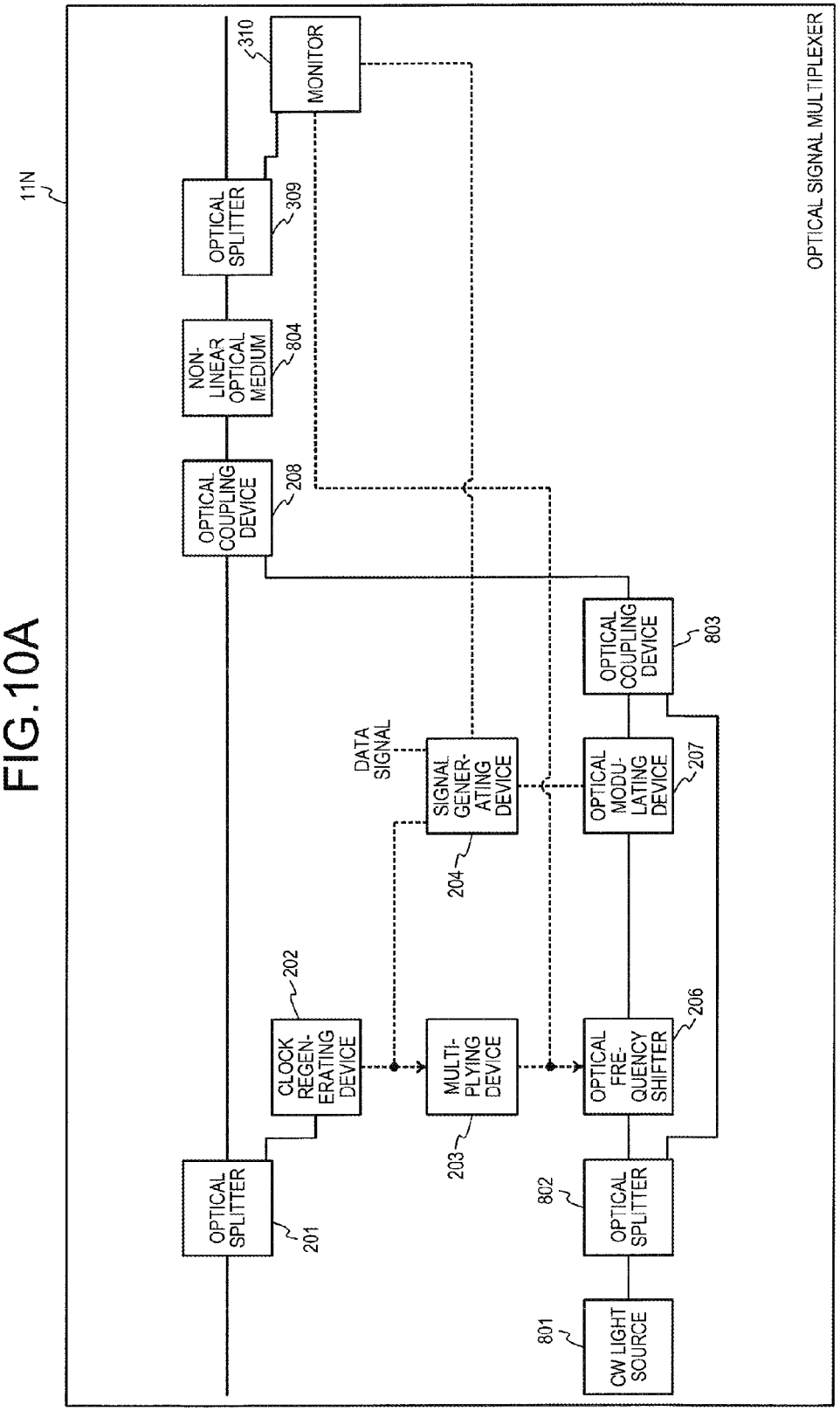
FIG. 10A is a diagram of a specific configuration of the optical signal multiplexer at the N-th stage.
Figure 10B:
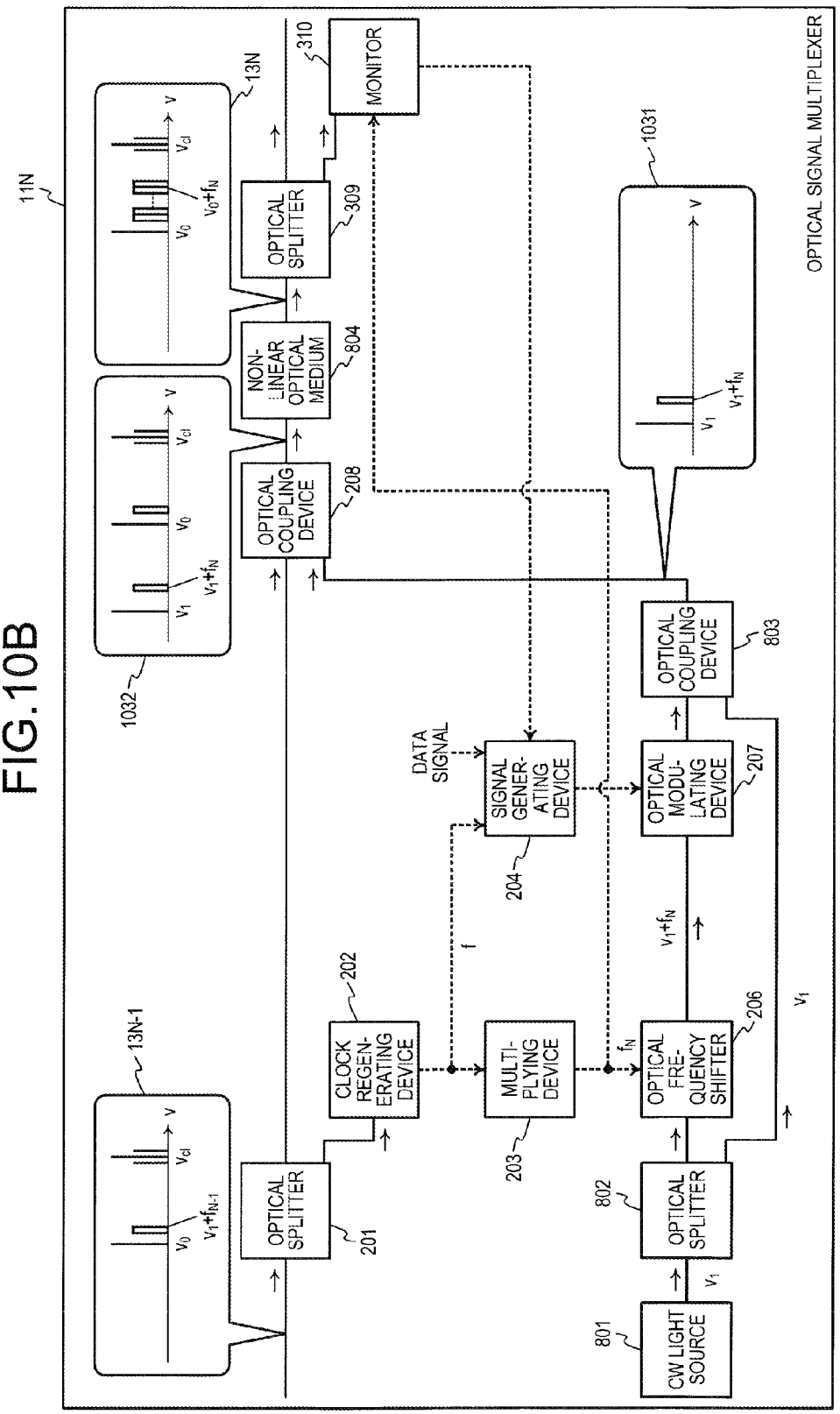
FIG. 10B is a diagram of an example of the flow of light beams and electrical signals in the optical signal multiplexer depicted in FIG. 10A.

FIG. 10A is a diagram of a specific configuration of the optical signal multiplexer at the N-th stage. FIG. 10B is a diagram of an example of the flow of light beams and electrical signals in the optical signal multiplexer depicted in FIG. 10A. In FIGS. 10A and 10B, components identical to those depicted in FIGS. 8A to 9B are given the same reference numerals used in FIGS. 8A to 9B and will not again be described.

The optical frequency shifter 206 of the optical signal multiplexer 11N, using the clock signal at the frequency fN output from the multiplying device 203, executes frequency shifting to convert the frequency v1 of the continuous wave light beam output from the optical splitter 802 into the frequency v1+fN.

The optical modulating device 207, using the driving signal output from the signal generating device 204, modulates the continuous wave light beam of the frequency v1+fN output from the optical frequency shifter 206 and outputs the optical signal resulting from the modulation to the optical coupling device 803. The optical coupling device 803 couples the optical signal of the frequency v1+fN output from the optical modulating device 207 and the continuous wave light beam of the frequency v1 output from the optical splitter 802, as represented by a spectrum 1031, and outputs the coupled light beam to the optical coupling device 208.

The optical coupling device 208 outputs the coupled light beam to the non-linear optical medium 804. The light beam output from the optical coupling device 208 is a light beam formed by adding the continuous wave light beam of the frequency v1 and the optical signal of the frequency v1+fN to the components represented by the spectrum 13(N−1), as represented by a spectrum 1032.

The non-linear optical medium 804 frequency-converts the optical signal of the frequency v1+fN included in the light beam output from the optical coupling device 208 into the optical signal of the frequency v0+fN and outputs the optical signal of the frequency v0+fN. Thereby, the optical signal of the frequency v0+fN can be added to the light beam output from the optical signal multiplexer 11(N−1), as represented by the spectrum 13N.

A case has been described where the non-linear optical medium 804 frequency-converts the optical signal of the frequency v1+fN into the optical signal of the frequency v0+fN and outputs the optical signal of the frequency v0+fN. However, the non-linear optical medium 804 may frequency-converts the optical signal of the frequency v1+fN into the optical signal of the frequency v0+fN and may output the optical signal of the frequency v0+fN.

Figure 11B:
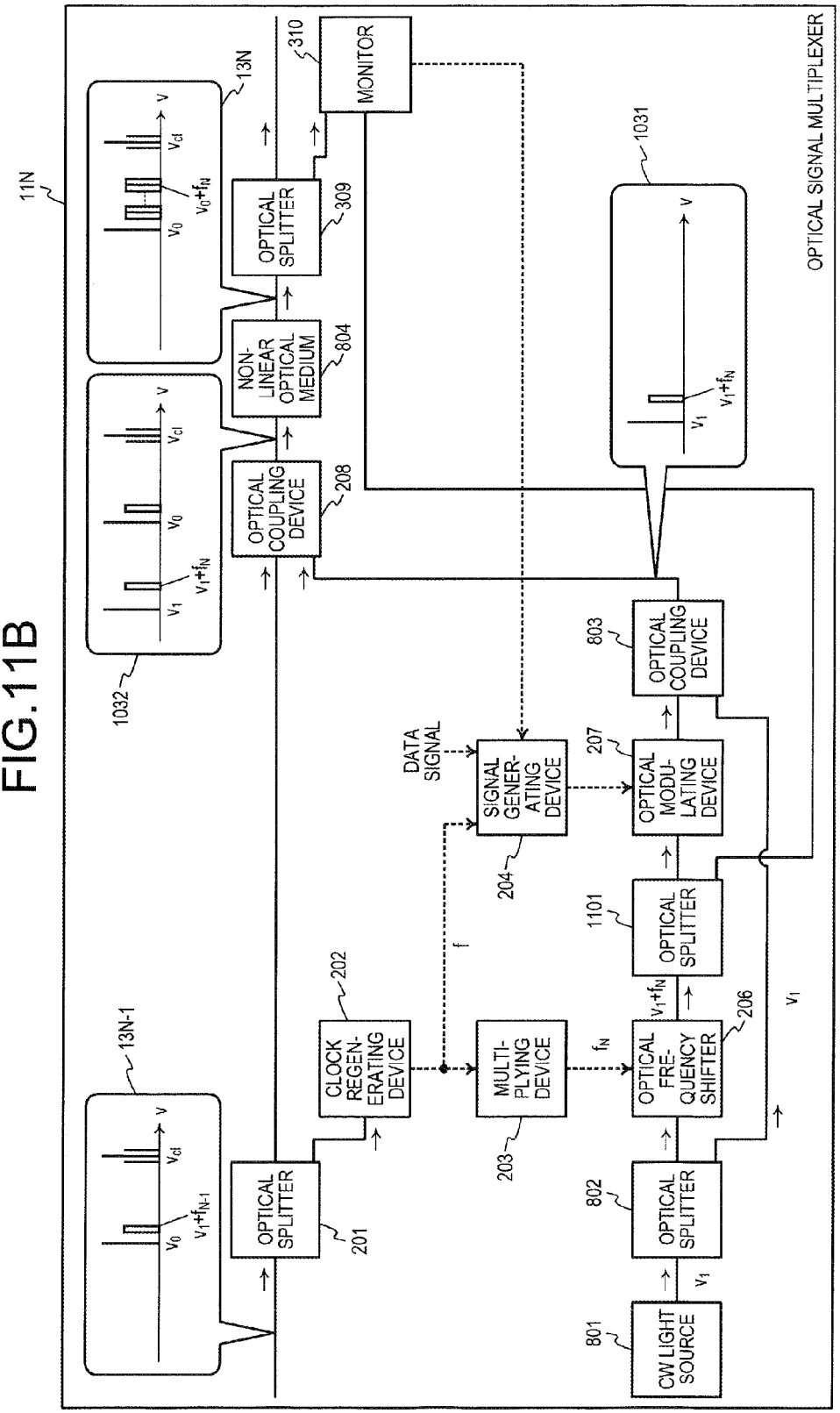
FIG. 11B is a diagram of an example of the flow of light beams and electrical signals in the optical signal multiplexer depicted in FIG. 11A.

FIG. 11A is a diagram of a specific configuration of the optical signal multiplexer at the N-th stage. FIG. 11B is a diagram of an example of the flow of light beams and electrical signals in the optical signal multiplexer depicted in FIG. 11A. In FIGS. 11A and 11B, components identical to those depicted in FIGS. 8A to 10B are given the same reference numerals used in FIGS. 8A to 10B and will not again be described.

The optical signal multiplexer 11N depicted in FIGS. 11A and 11B has a configuration for a case where the monitor 310 depicted in FIGS. 7A and 7B is adopted. As depicted in FIGS. 11A and 11B, the optical signal multiplexer 11N includes an optical splitter 1101 in addition to the optical signal multiplexer 11N.

The optical frequency shifter 206 outputs to the optical splitter 1101, the continuous wave light beam for which the frequency shifting is executed. The optical splitter 1101 outputs the continuous wave light beam of the frequency v1+fN output from the optical frequency shifter 206 to the optical modulator 207 and the monitor 310. The optical modulator 207, using the driving signal output from the signal generating device 204, modulates the continuous wave light beam of the frequency v1+fN output from the optical splitter 1101.

The monitor 310, using the clock signal at the frequency v1+fN output from the optical splitter 1101, receives (demodulates) the optical signal multiplexed by the optical coupling device 208 of the optical signal multiplexer 11N and the optical signal multiplexed by the optical signal multiplexer 11(N−1) at the previous stage thereof.

As described, according to the optical transmission system 100 according to the second embodiment, the same effect can be achieved as that of the first embodiment and optical signals can be multiplexed using the frequency conversion executed by the non-linear optical medium 804. Thus, optical signals can be multiplexed with low loss and over a wide band. Therefore, even when optical signals are sequentially multiplexed, the property of each of the optical signals included in the multiplexed signal light beam can be made uniform.

Each of the optical signal multiplexers 111 to 11N includes the CW light source 801, and the optical signal generated using the CW light source 801 is multiplexed and thereby, the multiplexing can be executed suppressing the attenuation of the signal light beam to be multiplexed.

Although OFDM is used in the first and the second embodiments, the multiplexing is not limited to this and, for example, Nyquist wavelength division multiplex (WDM) is also applicable.

According to an aspect of the present embodiments, an effect is achieved that cross-talk between optical signals can be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission system comprising
a plurality of multiplexers connected in series and each multiplexing an optical signal and given signal light including continuous wave light of a predetermined frequency, wherein
each of the multiplexers comprises:
   a multiplexing unit that multiplexes the given signal light that is subject to multiplexing and a second optical signal of a frequency that is adjacent to the frequency of a first optical signal that is included in the given signal light;
   a monitoring unit that monitors deviation between timings of the first optical signal that is included in the signal light multiplexed with the second optical signal by the multiplexing unit, and the second optical signal;
   an adjusting unit that based on a result of monitoring by the monitoring unit, adjusts the timing of the second optical signal that is to be multiplexed with the given signal light, by the multiplexing unit;
   an acquiring unit that acquires a clock signal common to the multiplexers;
   a generating unit that generates and outputs a data signal based on the clock signal acquired by the acquiring unit;
   a modulating unit that based on the data signal output from the generating unit, modulates continuous wave light of a frequency adjacent to the frequency of the first optical signal and obtains the second optical signal;
   an extracting unit that extracts the continuous wave light that is of the predetermined frequency and included in the given signal light; and
   a shifting unit that, using the plural multiplexers, shifts the frequency of the extracted continuous wave light by an amount that differs for each of the multiplexers, wherein
   the modulating unit modulates the continuous wave light whose frequency has been shifted by the shifting unit; and
   the multiplexing unit multiplexes the second optical signal obtained by the modulating unit and the given signal light.

2. The optical transmission system according to claim 1, wherein the adjusting unit adjusts the timing of the second optical signal by adjusting a timing for the data signal to be output from the generating unit.

3. The optical transmission system according to claim 1, each of the multiplexers comprising
a multiplying unit that multiplies a frequency of the acquired clock signal by a multiplying factor that differs for each of the multiplexers, wherein
the shifting unit shifts based on the clock signal whose frequency has been multiplied by the multiplying unit, the frequency of the continuous wave light extracted by the extracting unit.

4. The optical transmission system according to claim 1, wherein
the given signal light includes clock signal light that is based on the clock signal, and
the acquiring unit acquires the clock signal, based on the clock signal light included in the given signal light.

5. The optical transmission system according to claim 1, wherein
the monitoring unit executes photo-electric conversion with respect to frequency components of the first and the second optical signals of the given signal light multiplexed with the second optical signal by the multiplexing unit and based on the frequency components obtained by the photo-electric conversion, monitors deviation between the timings of the first and the second optical signals.

6. An optical transmission system comprising
a plurality of multiplexers connected in series and each multiplexing an optical signal and given signal light, wherein
each of the multiplexers comprises:
a multiplexing unit that multiplexes the given signal light that is subject to multiplexing and a second optical signal of a frequency that is adjacent to the frequency of a first optical signal that is included in the given signal light;
a monitoring unit that monitors deviation between timings of the first optical signal that is included in the signal light multiplexed with the second optical signal by the multiplexing unit, and the second optical signal;
an adjusting unit that based on a result of monitoring by the monitoring unit, adjusts the timing of the second optical signal that is to be multiplexed with the given signal light, by the multiplexing unit;
an acquiring unit that acquires a clock signal common to the multiplexers;
a generating unit that generates and outputs a data signal based on the clock signal acquired by the acquiring unit;
a light source that generates continuous wave light of a predetermined frequency;
a shifting unit that shifts the frequency of the generated continuous wave light by an amount that differs for each of the multiplexers;
a modulating unit that based on the data signal output from the generating unit, modulates the continuous wave light whose frequency has been shifted by the shifting unit; and
a coupling unit that couples into signal light, an optical signal obtained by the modulating unit and the continuous wave light generated by the light source, wherein
the multiplexing unit multiplexes the second optical signal and the given signal light by coupling into signal light, the given signal light beam and the signal light obtained by the coupling unit, and transmitting the coupled signal light through a non-linear optical medium.

7. A control method of a plurality of multiplexers connected in series and each comprising a multiplexing unit that multiplexes given signal light including continuous wave light of a predetermined frequency and that the given signal light is subject to multiplexing and a second optical signal of a frequency that is adjacent to the frequency of a first optical signal that is included in the given signal light, the control method comprising:
monitoring deviation between timings of the first optical signal that is included in the signal light multiplexed with the second optical signal by the multiplexing unit, and the second optical signal;
adjusting based on a result of the monitoring, the timing of the second optical signal that is to be multiplexed with the given signal light, by the multiplexing unit;
acquiring a clock signal common to the multiplexers;
generating and outputting a data signal based on the clock signal acquired by the acquiring unit;
modulating, based on the data signal output from the generating unit, continuous wave light of a frequency adjacent to the frequency of the first optical signal and obtains the second optical signal;
extracting the continuous wave light that is of the predetermined frequency and included in the given signal light; and
shifting, using the plural multiplexers, the frequency of the extracted continuous wave light by an amount that differs for each of the multiplexers, wherein
the modulating modulates the continuous wave light whose frequency has been shifted by the shifting unit; and
the multiplexing multiplexes the second optical signal obtained by the modulating unit and the given signal light.

* * * * *